(12) United States Patent
Hayakawa

(10) Patent No.: US 8,693,044 B2
(45) Date of Patent: Apr. 8, 2014

(54) DYNAMIC PRINT IMAGE PREVIEW BASED ON USER SELECTED IMAGE DATA

(75) Inventor: Keitaro Hayakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1123 days.

(21) Appl. No.: 11/821,045

(22) Filed: Jun. 21, 2007

(65) Prior Publication Data

US 2007/0285681 A1 Dec. 13, 2007

(30) Foreign Application Priority Data

Jul. 6, 2006 (JP) ................. P2006-186303

(51) Int. Cl.
*G06F 15/00* (2006.01)
*G06F 3/12* (2006.01)
*G06K 15/02* (2006.01)

(52) U.S. Cl.
USPC ........... 358/1.2; 358/1.9; 358/1.15; 358/1.18; 382/298; 715/274

(58) Field of Classification Search
None
See application file for complete search history.

(56) References Cited

U.S. PATENT DOCUMENTS

| 6,791,709 B1 * | 9/2004 | Nakamura et al. ........... 358/1.18 |
| 2002/0048413 A1 * | 4/2002 | Kusunoki ...................... 382/282 |
| 2005/0002063 A1 * | 1/2005 | Hanamoto .................... 358/1.18 |
| 2006/0177132 A1 * | 8/2006 | Jackson et al. ................ 382/173 |
| 2007/0035771 A1 * | 2/2007 | Kitamaru ..................... 358/1.18 |
| 2009/0279120 A1 * | 11/2009 | Gerega ......................... 358/1.15 |

FOREIGN PATENT DOCUMENTS

| JP | 11-331542 | 11/1999 |
| JP | 2000-057363 | 2/2000 |
| JP | 2003-244586 | 8/2004 |

* cited by examiner

*Primary Examiner* — Vincent Rudolph
(74) *Attorney, Agent, or Firm* — Robert J. Depke; The Chicago Technology Law Group, LLC

(57) ABSTRACT

An operation screen generating apparatus includes: an image-in-work-screen generating unit that displays a subject image on a work screen, which is displayed at an aspect ratio same as that of a print area, in a display position and at a display magnification designated by user operation; and an image-in-confirmation-screen generating unit that displays in enlargement, on a confirmation screen prepared separately from the work screen, a reference line representing an outer edge position of the work screen and a subject image located near an outside and an inside of the reference line.

11 Claims, 27 Drawing Sheets

AUTOMATIC SETTING

DYNAMIC PRINT IMAGE PREVIEW BASED ON USER SELECTED IMAGE DATA

CROSS-REFERENCES TO RELATED APPLICATIONS

The present invention contains subject matter related to Japanese Patent Application JP 2006-186303 filed in the Japanese Patent Office on Jul. 6, 2006, the entire contents of which being incorporated herein by reference.

BACKGROUND OF THE INVENTION

1. Field of the Invention

The present invention relates to a technique for displaying an operation screen used in manually adjusting an arrangement in a screen and a display magnification of a subject image. The present invention relates more particularly to an operation screen generating apparatus, a printing apparatus, an imaging apparatus, an operation screen generating method, and a computer program.

2. Description of the Related Art

An aspect ratio of an original image (a subject image) as a printing object and an aspect ratio of a print sheet do not always coincide with each other. In such a case, it is necessary to set a print area on the original image (the subject image) to coincide with the aspect ratio of the print sheet.

As a method for this kind of setting, there are two kinds of methods, namely, a manual setting method and an automatic setting method.

In the case of the manual setting method, setting of a print area is executed through operation of a user himself/herself for moving and/or expanding and reducing a rectangular frame displayed on a print sheet. A rectangular frame is set the same as an aspect ratio of the print sheet (see, for example, JP-A-2003-244586).

An example of setting of a print area according to the manual setting method is shown in FIG. 1. In FIG. 1, an area of an original image (a subject image) 1 is considerably larger than an area of a print area 3. In this example, the print area 3 is moved from a figure on the left side onto a figure on the right side.

On the other hand, in the case of the automatic setting method, setting of a print area is automatically executed according to a relation between an aspect ratio of an original image and an aspect ratio of a print sheet (see, for example, JP-A-11-331542).

An example of setting of a print area according to the automatic setting method is shown in FIG. 2. In FIG. 2, the original image (the subject image) 1 is a panoramic image and the print area 3 is an L size area. In this example, a section near the center of the original image (the subject image) 1 is automatically set as the print area 3.

SUMMARY OF THE INVENTION

However, the existing methods have problems described below, respectively.

For example, in the manual setting method, although it is possible to freely position the print area 3, even if a part of the print area 3 extends beyond the original image 1, a user hardly notices this. Actually, when an area of the part is small, the user does not notice that the part of the print area 3 extends beyond the original image 1. The user notices this only when the part appears in a print result as unexpected margins.

An example of generation of the unexpected margins is shown in FIGS. 3A and 3B. FIG. 3A is an example of setting of the print area 3 with respect to the original image 1. FIG. 3B is a result of printing of the print area 3. As shown in FIG. 3B, margins appear on two sides (portions indicated by hatching) of the print area 3. However, it is difficult to confirm the margins on the present operation screen.

On the other hand, in the automatic setting method, since the print area 3 is positioned on the basis of a comparison of aspect ratios, unlike the manual setting method, unexpected margins is not generated in a print result.

However, when a composition and a size of a subject image automatically set are finely adjusted, eventually, the same problem as in the case of the manual operation occurs. In other words, since it is difficult to grasp a relation between outer edge positions of the original image (the subject image) 1 and outer edge positions of the print area 3, unexpected margins appear in a print result.

Therefore, it is desirable to provide an operation screen with which it is possible to easily confirm, while keeping a degree of freedom of setting of a print area, a positional relation among outer edges to prevent unexpected margins from being generated.

According to an embodiment of the present invention, there is provided an operation screen generating apparatus including (a) an image-in-work-screen generating unit that displays a subject image on a work screen, which is displayed at an aspect ratio same as that of a print area, in a display position and at a display magnification designated by user operation and (b) an image-in-confirmation-screen generating unit that displays in enlargement, on a confirmation screen prepared separately from the work screen, a reference line representing an outer edge position of the work screen and a subject image located near the outside and the inside of the reference line.

According to the embodiment of the invention, on the operation screen, the confirmation screen is displayed separately from the work screen but on a screen same as a screen on which the work screen is displayed. On the confirmation screen, the outer edge position of the work screen is represented as the reference line and the enlarged image of the subject image located near the inside and the outside of the reference line (the outer edge position) is displayed.

Therefore, if a positional relation between the enlarged image and the reference line displayed on the confirmation screens is confirmed, it is possible to easily confirm presence or absence and the width of a margin, which appears in a print result, a position of a break of the subject image, and the like.

DESCRIPTION OF THE PREFERRED EMBODIMENTS

A display function of an operation screen according to an embodiment of the present invention will be hereinafter explained.

The well-known or publicly-known techniques in the technical field are applied to components not specifically shown in the figures nor described in this specification.

An embodiment explained below is merely an embodiment of the present invention. The present invention is not limited to the embodiment.

(A) Self-Operation Type Printing Apparatus

A display technique according to an embodiment of the present invention implemented on a self-operation type printing apparatus will be hereinafter explained. In this specification, the self-operation type printing apparatus means a printing system for business use set in shops, event sites, and the like.

(A-1) Example of an External Structure

Figure 1:
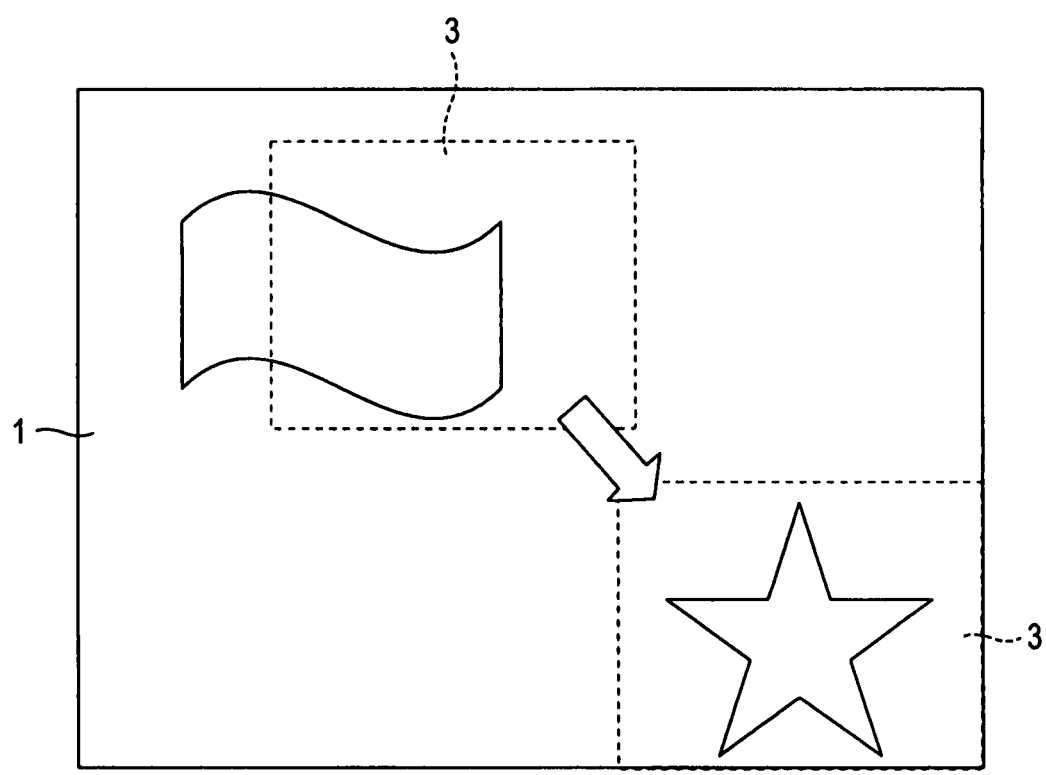
FIG. 1 is a diagram for explaining a method of setting a print area according to a manual setting method.
Figure 2:
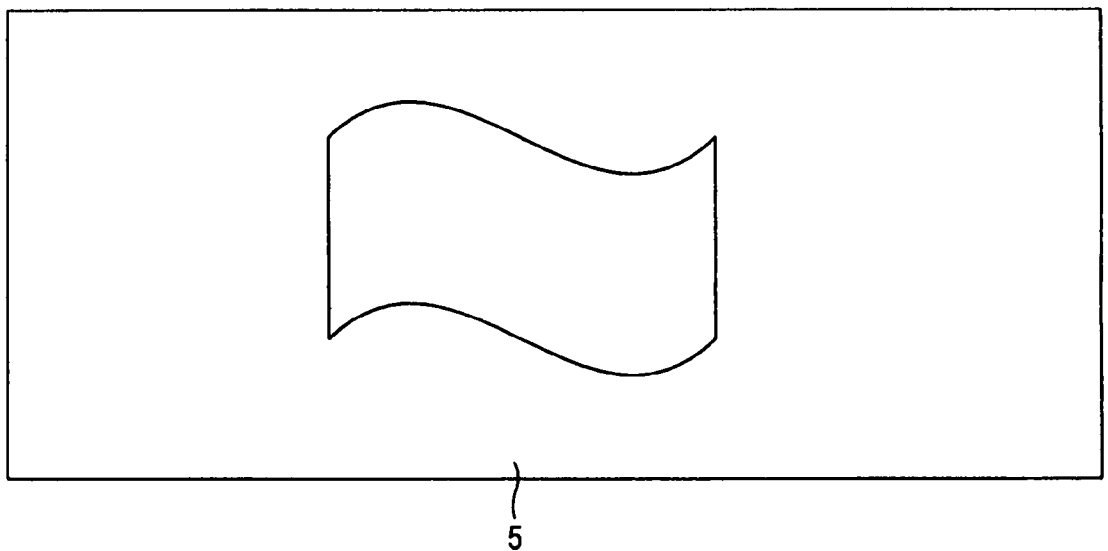
FIG. 2 is a diagram for explaining a method of setting a print area according to an automatic setting method.
Figure 2:
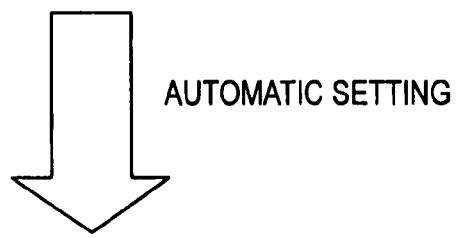
Figure 2:
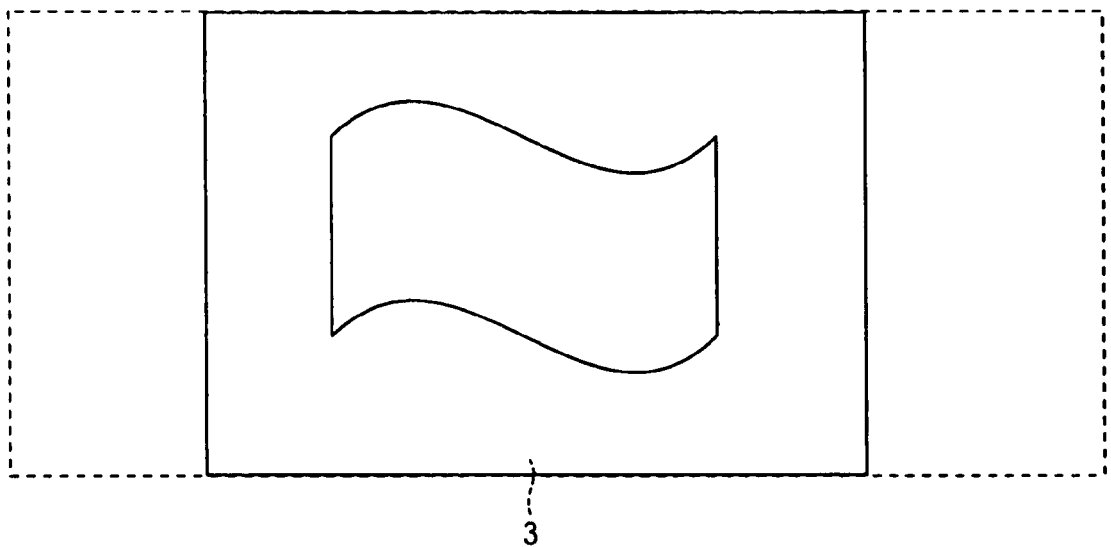
Figure 3A:
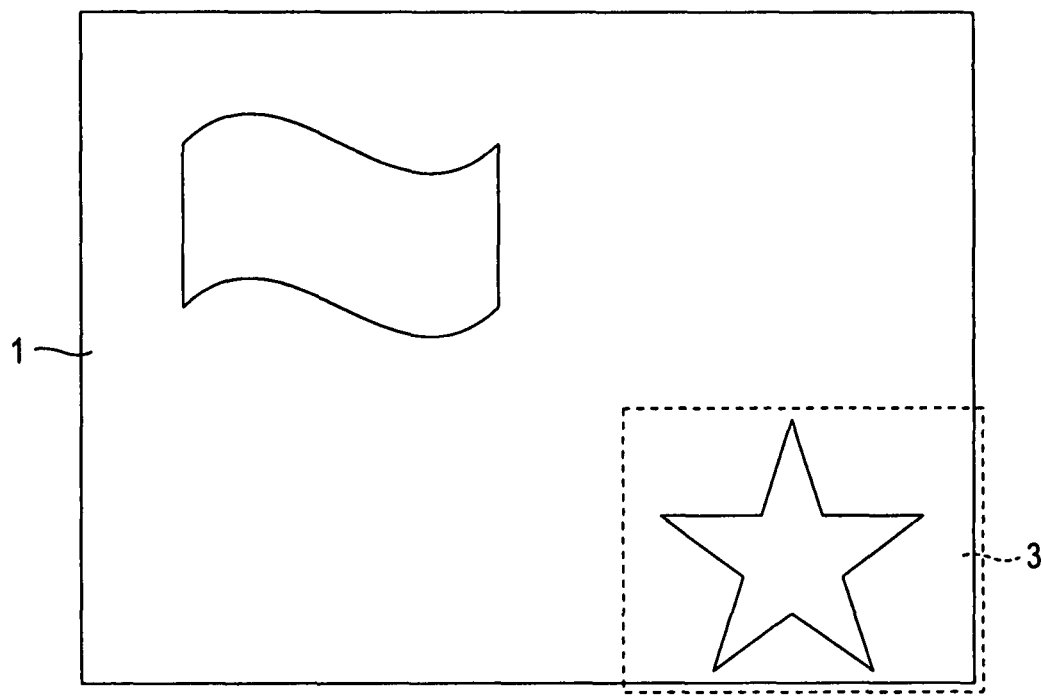
FIGS. 3A and 3B are diagrams showing an example of generation of unexpected margins.
Figure 3B:
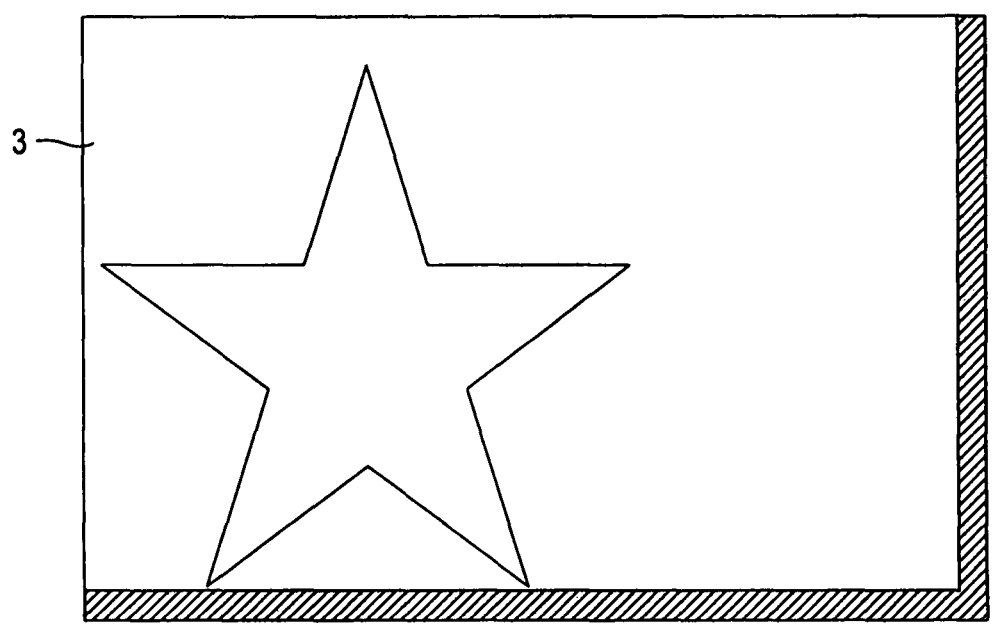
Figure 4:
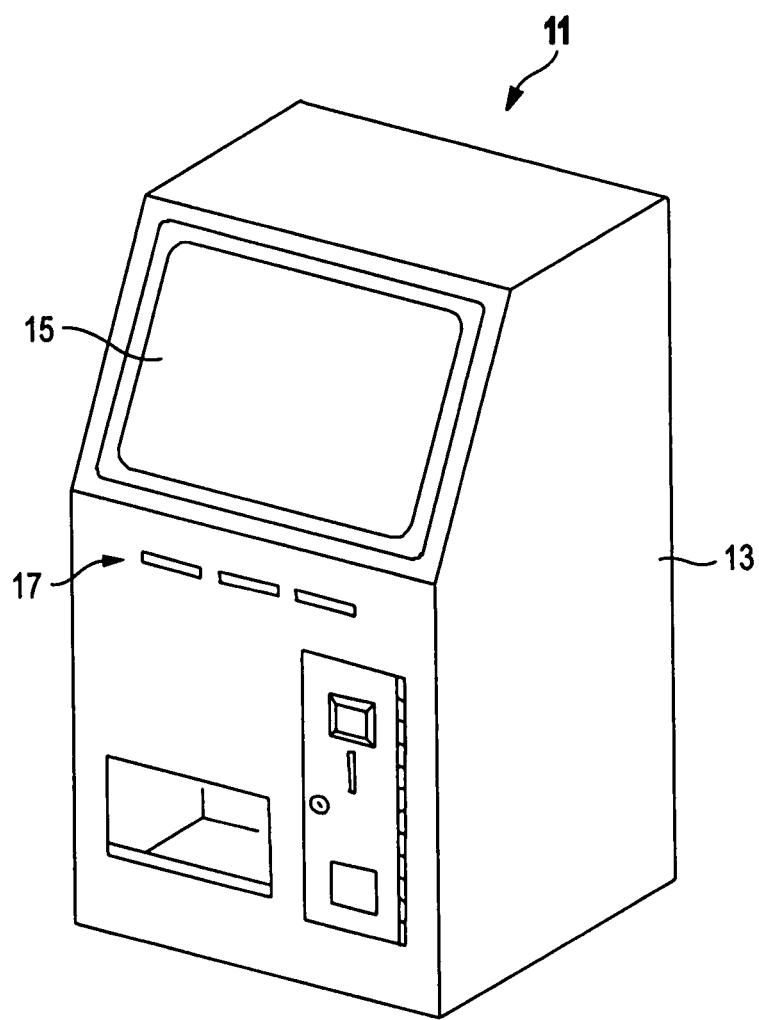
FIG. 4 is a diagram showing an example of an external structure of a self-operation type printing apparatus.

An example of an external structure of a self-operation type printing apparatus 11 is shown in FIG. 4. This self-operation type printing apparatus 11 has a control apparatus and a sublimation-type printing apparatus built in a housing 13 of a box shape.

In an upper part in the front of the housing 13, a touch panel screen 15 is arranged. This touch panel screen 15 is a complex display device in which a touch panel is arranged on the surface of a display screen.

In the center in the front of the housing 13, media slots 17 for inserting an external storage medium carried by a user are arranged. Plural types of the media slots 17 are prepared according to shapes and standards of portable recording media. The portable recording media include optical recording media of a disk shape and semiconductor storage devices of a card shape and a gum shape.

In a lower part in the front of the housing 13, payment adjustment ports and a photo take-out opening are arranged. A printed photograph is discharged to the photo take-out opening. The user can take out the printed photograph by inserting a hand into the photo take-out opening.

In the self-operation type printing apparatus 11, roll paper (a printing medium wound into a roll shape) and an ink ribbon are mounted as consumables. The ink ribbon is formed by films applied with a set of solid inks corresponding to basic colors for printing in order.

(A-2) Structure in the Inside of the Housing

Figure 5:
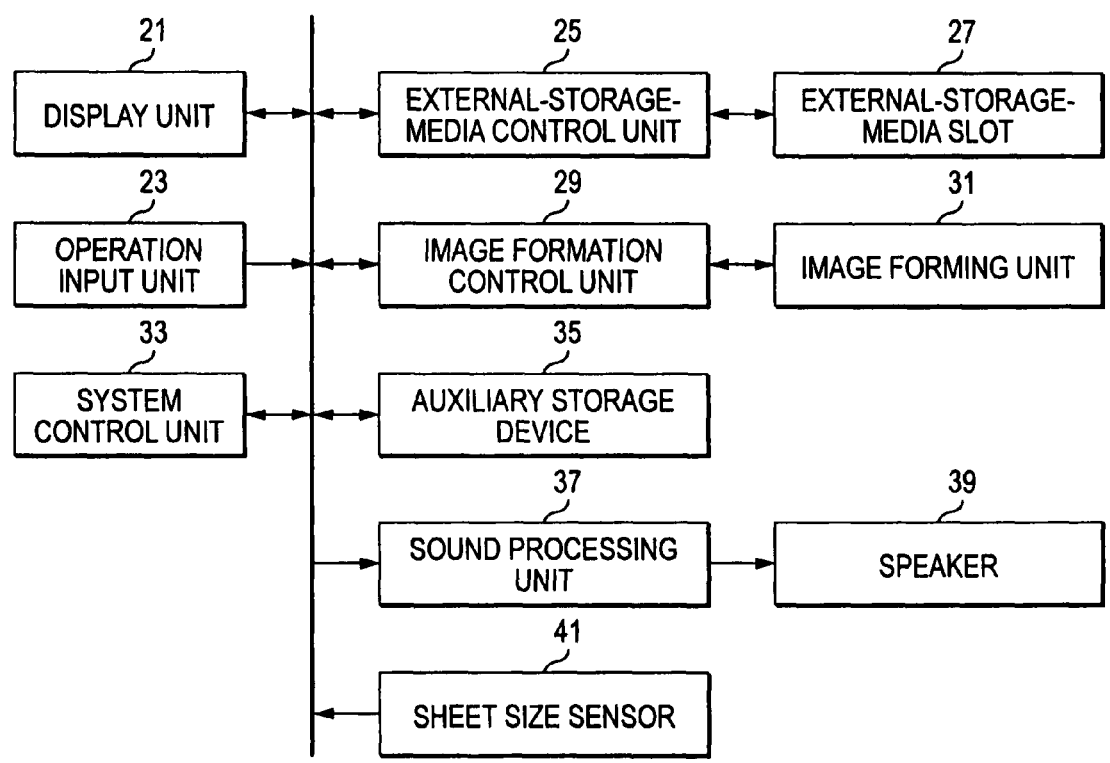
FIG. 5 is a diagram showing an example of a functional structure of the self-operation type printing apparatus.

A functional block structure in the inside of the housing of the self-operation type printing apparatus 11 is shown in FIG. 5. This self-operation type printing apparatus 11 includes a display unit 21, an operation input unit 23, an external-storage-media control unit 25, an external-storage-media slot 27, an image-formation control unit 29, an image forming unit 31, a system control unit 33, an auxiliary storage device 35, a sound processing unit 37, a speaker 39, and a sheet size sensor 41.

The display unit 21 is a display device that displays an acceptance screen and the like for photograph printing. For example, the display unit 21 is constituted by a CRT display or a flat panel display. The acceptance screen is used for acceptance of selection of a print image, the number of outputs, and a size and an aspect ratio of a print sheet, editing of a composition, and the like.

The operation input unit 23 is an input device that gives an instruction content corresponding to operation by a user to the system control unit 33. As described above, in this embodiment, the touch panel is used for the operation input unit 23. It goes without saying that the operation input unit 23 may be constituted by buttons, switches, or other pointing devices.

The external-storage-media control unit 25 is a control device that controls reading of data from and writing of data in an external storage medium inserted in the external-storage-media slot 27 (the media slots 17 in FIG. 4). The external-storage-media control unit 25 realizes a function of accessing a file system of the external storage medium and reading out a necessary data file. The data file read out is stored in the auxiliary storage device 35.

The image-formation control unit 29 is a control device that controls output of image data to the image forming unit 31 connected to the image-formation control unit 29 through a connector. Usually, a plurality of the image forming units 31 are mounted according to print sizes. The image-formation control unit 29 provides a function of outputting the image data for each print queue corresponding to a sheet size indicated by the user.

In the case of this example, the print sizes are four sizes, namely, an L size (3.5×5 inches), 2 L size (5×7 inches), a KG size (4×6 inches), and a 2 KG size (6×8 inches). The image forming unit 31 includes a print head of a sublimation type (a head in which a large number of heating elements independently driven are arrayed in a row) and a driving circuit therefor.

The system control unit 33 is a control device that controls the entire system in accordance with firmware. For example, the system control unit 33 is constituted by a microprocessor. The system control unit 33 executes a function of generating an operation screen (a user interface screen), a function of printing a subject image, a function of converting a data format, and the like.

For example, when image data is given in a non-compressed format (an RGB data format), the system control unit 33 executes processing for adjusting a hue of original image data to be adapted to printing.

When image data is given in a compressed format, the system control unit 33 executes processing for decompressing compressed image data and processing for converting the image data after decompression (Y (luminance) data and Cb and Cr (color difference) data) into the RGB data format.

When printing is executed, the system control unit 33 executes processing for converting the image data of the RGB data format into image data of a CMYK data format. Here, the CMYK data format means a data format given by four colors of cyan (C), magenta (M), yellow (Y), and black (K). It goes without saying that, when print colors other than these four colors are prepared, processing for converting the image data of the RGB data format into a data format including the color is executed.

The auxiliary storage device 35 is a storage device used for storage of firmware, image data, advertisement data, and the like. For example, the auxiliary storage device 35 is constituted by a hard disk device, which is one of magnetic storage devices. The auxiliary storage device 35 stores, other than a generation program for an operation screen described later, information on plural kinds of print sizes and aspect ratios and the like.

The sound processing unit 37 is a signal processing device that outputs an operation explanation and an advertisement as sound. Sound and music are outputted through the speaker 39.

The sheet size sensor 41 is a sensor that automatically detects a size and an aspect ratio of a sheet to which mounted roll paper corresponds. A result of the detection is given to the system control unit 33.

(A-3) Example of the Function for Generating the Operation Screen (the User Interface Screen)

An example of a functional structure necessary for realizing the function of generating the operation screen (the user interface screen) according to this embodiment will be explained.

Figure 6:
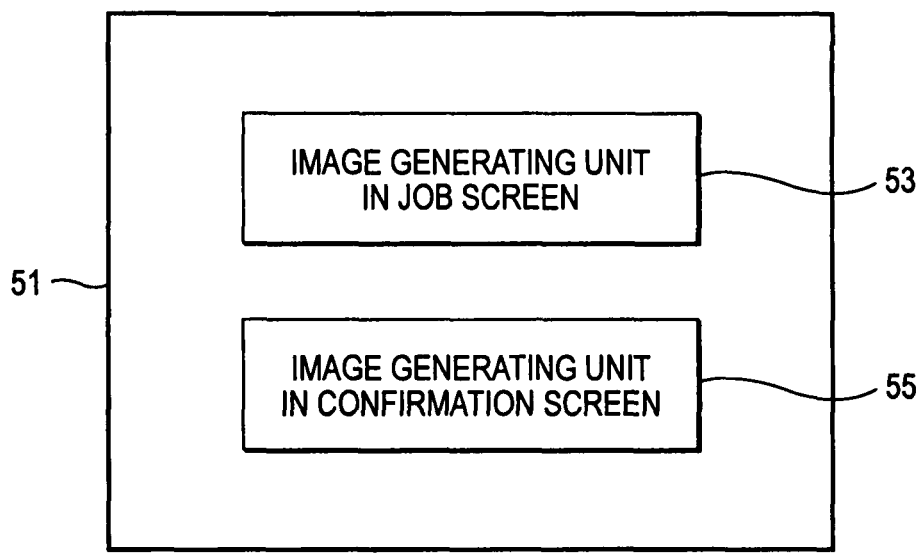
FIG. 6 is a diagram showing an example of a functional structure of an operation-screen generating function unit.

An example of a functional structure of an operation-screen generating function unit 51 is shown in FIG. 6. Naturally, FIG. 6 corresponds to only a function concerning the operation screen according to this embodiment among various operation screens displayed on a screen.

The operation-screen generating function unit 51 includes an image-in-work-screen generating unit 53 and an image-in-confirmation-screen generating unit 55.

The image-in-work-screen generating unit 53 is a processing function unit that displays a subject image on a work screen, which is displayed at an aspect ratio same as that of a print area, in a display position and at a display magnification designated by user operation.

The print area means a printable range in a sheet size detected by the sheet size sensor 41 or a sheet size individually designated by the user.

The image-in-confirmation-screen generating unit 55 is a processing function unit that displays, on confirmation screens prepared separately from the work screen, reference lines representing outer edge positions of the work screen and enlarged images of subject images located near the insides and the outsides of the reference lines.

Figure 7:
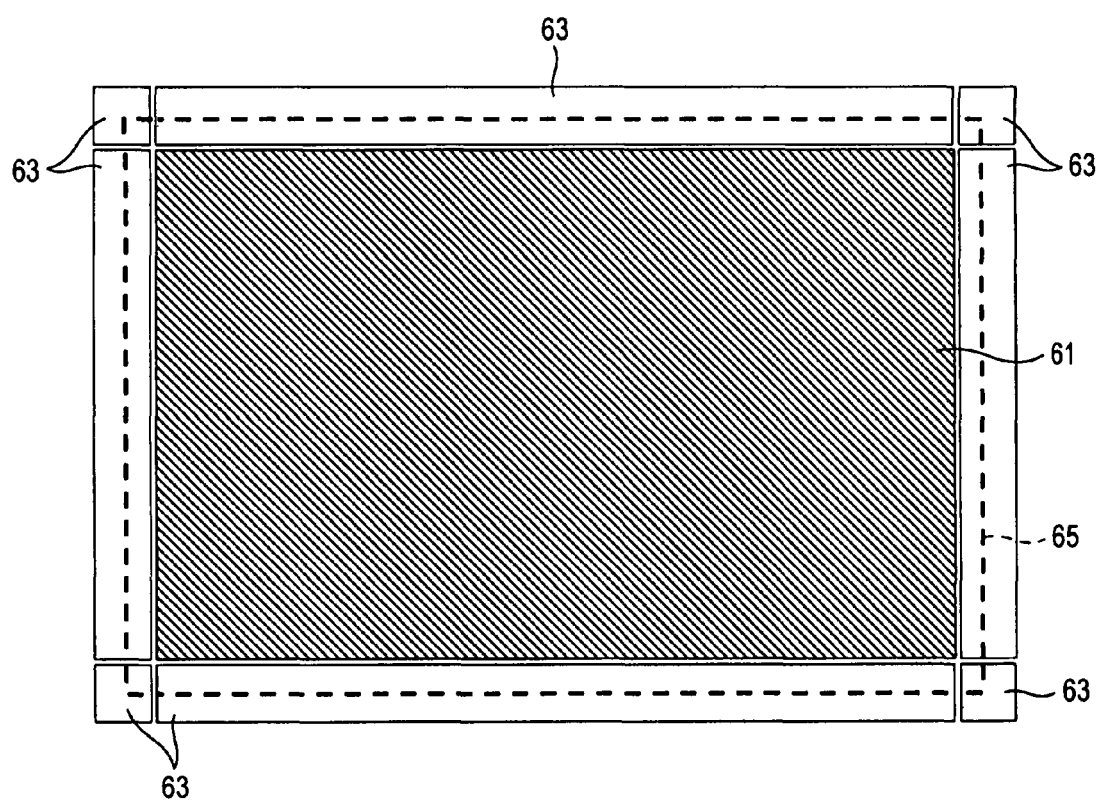
FIG. 7 is a diagram showing an example of a structure of an operation screen.

A structure of an operation screen provided as a premise of the operation-screen generating function unit 51 is shown in FIG. 7. As shown in FIG. 7, the operation screen includes a work screen 61 and confirmation screens 63 arranged along outer edges of the work screen 61.

The work screen 61 is a work area of the user used for selection and setting of a subject image, confirmation and editing of a composition, and the like. An aspect ratio of the work screen 61 is automatically adjusted to be the same as an aspect ratio of a usable print sheet and an aspect ratio of a print sheet designated by the user. A subject image selected as an editing object is displayed on this work screen 61. The subject image is displayed at an aspect ratio of an original image.

The confirmation screens 63 are display areas in which portions near outer edges of the work screen 61 are displayed in enlargement to make it easy to confirm subject images located at outer edges of the print area (which coincide with outer edges of the work screen 61). In the case of this embodiment, the subject images are displayed in a size twice as large as the subject image displayed on the work screen 61. Reference lines 65 representing outer edge positions of the work screen 61 are displayed on the confirmation screens 63. In the case of FIG. 7, the reference lines 65 are displayed as broken lines.

It is possible to identify the print area and a non-print area according to the display of the reference line 65.

For example, it is seen that subject images further on the work screen 61 side (inner side areas) than the reference lines 65 can be printed.

On the other hand, it is seen that it is difficult to print subject images in other portions (outer side areas).

Therefore, if overlapping portions of the subject images and the reference lines 65 are confirmed, it is possible to easily confirm to which portion it is possible to print the subject images and from which portion it is difficult to print the subject images. It is seen that, when there are gaps between the outer edges of the subject images and the reference lines 65, margins are generated during printing.

In this way, the confirmation screens 63 are convenient for confirming margins and breaks of the subject images.

In addition, on the confirmation screens 63, the subject images in positions corresponding thereto are displayed in a size twice as large as the subject image displayed on the work screen 61. Therefore, it is easier to confirm margins and breaks of the image.

In FIG. 7, the confirmation screens 63 are arranged in eight outer edge positions corresponding to four sides and four corners of the work screen 61.

Figure 8:
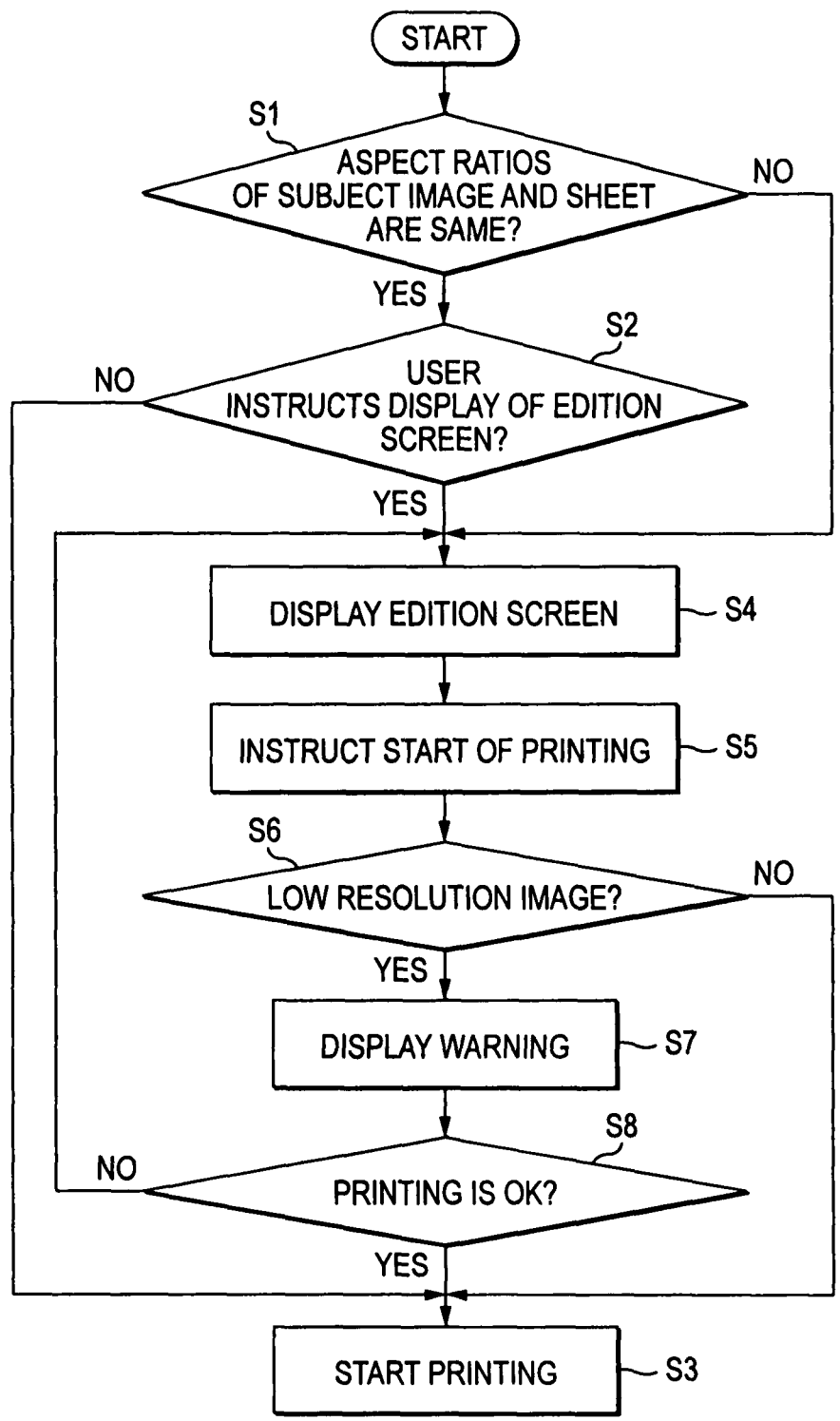
FIG. 8 is a diagram showing an example of a processing procedure up to the start of printing.

(A-4) Operations from the Determination of a Subject Image to the Start of Printing An example of a processing procedure from the determination of a subject image to the start of printing is shown in FIG. 8. The processing procedure shown in FIG. 8 is executed at a point when a specific subject image is selected on the operation screen.

First, the system control unit 33 judges whether aspect ratios of the subject image selected and a print sheet are the same (S1).

When an affirmative result is obtained in processing S1, the system control unit 33 judges whether the user instructs display of an editing screen (S2). This judgment processing is prepared for a user who wants to add a composition and a decoration of a subject image before starting printing.

When a negative result is obtained in processing S2, the system control unit 33 instructs the image-formation control unit 29 to start printing (S3).

In this case, the system control unit 33 outputs image data obtained by converting primary color data (RGB data) into complementary color data (CMYK data) to the image-formation control unit 29. On the other hand, the image-formation control unit 29 executes gamma conversion processing, pulse width conversion processing, and other image processing on this image data. In other words, the image-formation control unit 29 executes processing for conversion into a data format suitable for driving of a print head of a sublimation type.

In this case, the aspect ratios of the subject image and the print sheet are the same. An image size of the subject image is adjusted to prevent margins from appearing around the print sheet. This operation procedure is the same as that in the method of automatically setting an aspect ratio.

On the other hand, when a negative result is obtained in processing S1 or an affirmative result is obtained in processing S2, the system control unit 33 displays an editing screen on the touch panel screen 15 (S4).

Figure 9:
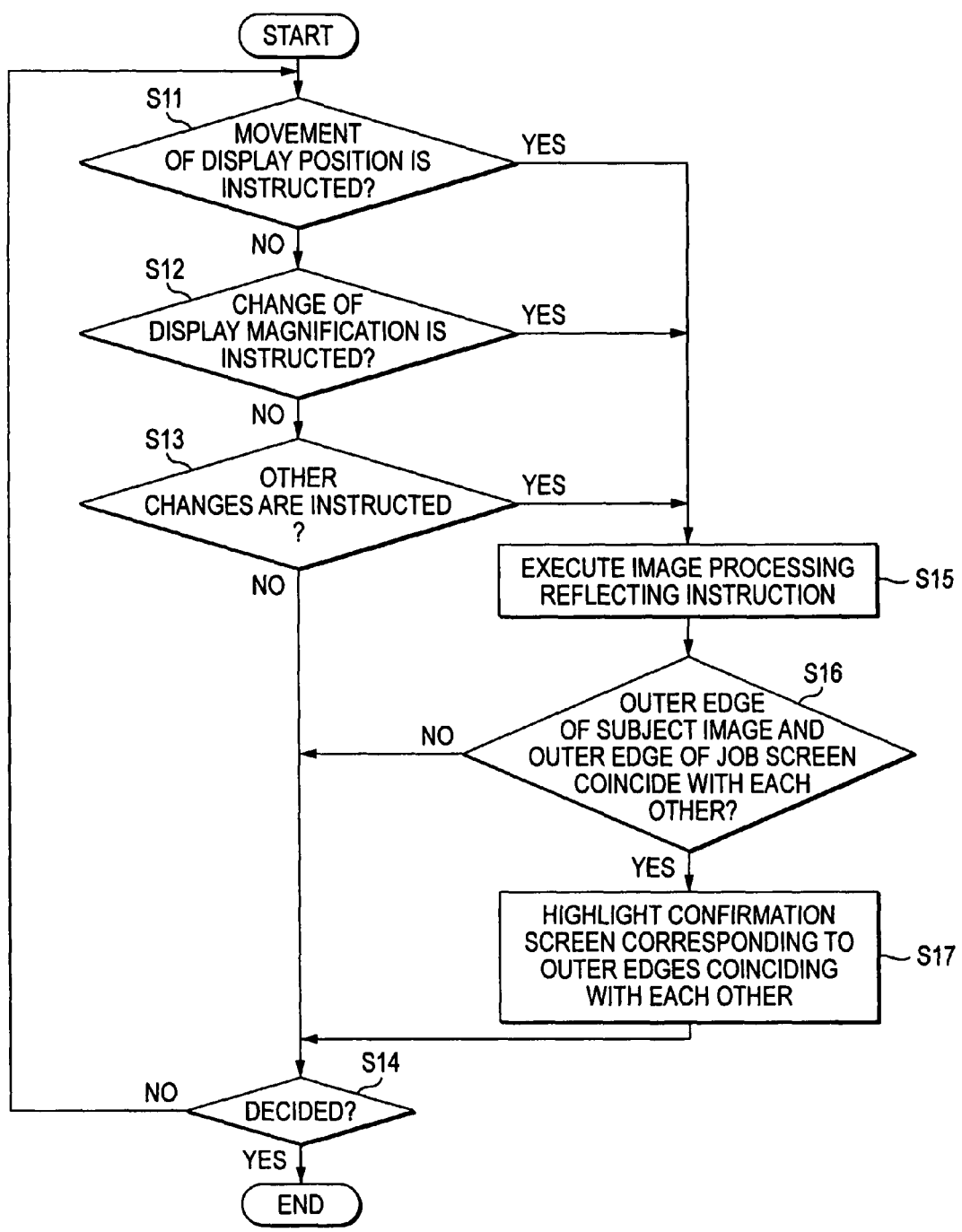
FIG. 9 is a diagram showing an example of a processing procedure concerning display of an editing screen.

An example of a processing procedure executed in relation to the processing for displaying the editing screen is shown in FIG. 9. The system control unit 33 judges presence or absence and contents of an instruction input.

First, the system control unit 33 judges whether movement of a display position of the subject image is instructed (S11) This operation is performed, for example, when a positional relation of the subject image to a print area (e.g., a composition and presence or absence of margins) is adjusted.

When a negative result is obtained in this judgment processing, the system control unit 33 judges whether a change in a display magnification of the subject image is instructed (S12). This operation is performed, for example, when a size of the subject image is optimized or when it is desired to eliminate margins.

When a negative result is also obtained in processing S12, the system control unit 33 separately judges whether operable other operation is instructed (S13). In the case of FIG. 9, in order to omit a description, these kinds of judgment processing are shown as one judgment step. The judgment processing in this context includes processing for judging, for example, addition of a date, addition of a decoration, a change in the subject image, a change of a sheet size, a change of a display screen format, and display of a help screen.

When negative results are obtained in all of these kinds of processing, the system control unit 33 judges whether editing operation has been decided (S14). When a negative result is obtained in processing S14, the system control unit 33 repeats the series of judgment processing.

When an affirmative result is obtained in any one of these kinds of judgment processing S11 to S13, the system control unit 33 executes image processing that reflects an instruction input of the user (S15).

Thereafter, the system control unit 33 judges whether an outer edge of the subject image after the image processing and an outer edge of the work screen 61 coincide with each other (S16).

When a negative result is obtained in this judgment processing S16, the system control unit 33 shifts to the processing for judging presence or absence of decision of work as described above (S14).

On the other hand, when an affirmative result is obtained in judgment processing S16, the system control unit 33 highlights the confirmation screen 63 corresponding to the outer edges coinciding with each other (S17). In this highlighting, for example, processing for increasing luminance or changing a display color of the confirmation screen 63 corresponding to the outer edges, processing for increasing luminance or changing a display color of a display frame, or other processing is executed.

Decision of the editing work is executed by, for example, operation of a print button. When the operation of the print button is detected, the system control unit 33 judges that the start of printing is instructed (S5 in FIG. 8).

Thereafter, the system control unit 33 judges whether the subject image as a print object is a low-resolution image (S6). In other words, the system control unit 33 judges, on the basis of a relation between the number of pixels of the subject image located in the print area and the print sheet, whether a low-resolution image with a low quality is obtained when the subject image is printed.

When it is judged that the subject image is not the low-resolution image, the system control unit 33 starts processing for printing the subject image (S3).

On the other hand, when it is judged that the subject image is the low resolution image, the system control unit 33 displays a warning on the screen and inquires the user whether the printing operation should be continued (S7).

Thereafter, the system control unit 33 judges whether the user desires continuation of the printing operation (S8).

When an affirmative result is obtained in this judgment processing, the system control unit 33 directly starts printing of the subject image (S3). On the other hand, when a negative result is obtained, the system control unit 33 returns to the display of the editing screen (processing S4) in order to perform the editing again.

The subject image is printed on the print sheet through these kinds of processing.

(A-5) Example of the Operation Screen

Figure 10:
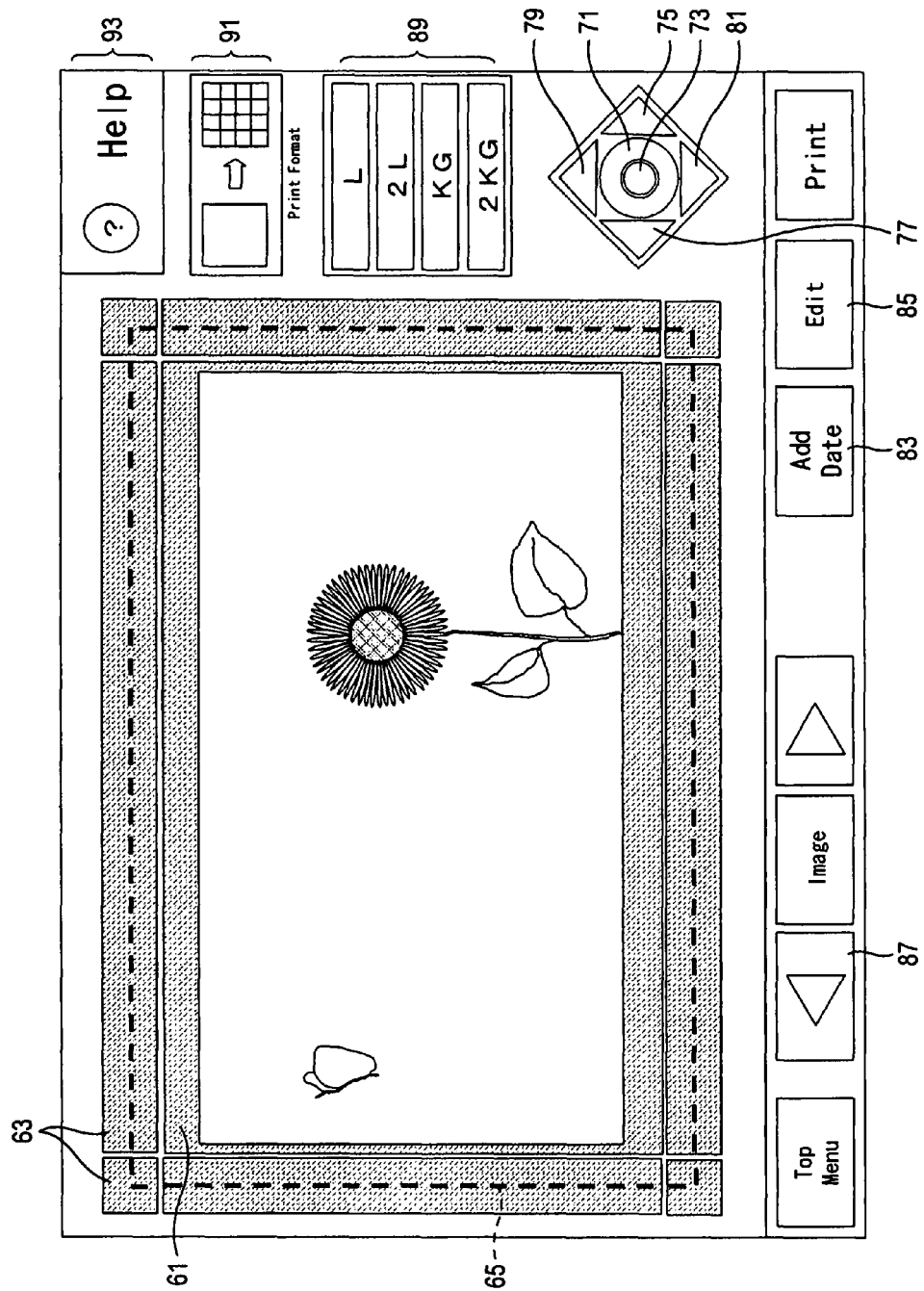
FIG. 10 is a diagram showing an example of the operation screen.

An example of the operation screen used in the editing operation is shown in FIG. 10. In FIG. 10, an aspect ratio of the subject image (in the figure, a portion of a background white color in which a flower and a butterfly are drawn) is 9:16 and an aspect ratio of the print sheet is 7:10.

Since the aspect ratios are different, margins (areas indicated by hatching) are generated at the outer edges of the work screen 61.

In the case of this example, the margins appear at all the eight outer edges forming the work screen 61. Therefore, the margins (the areas indicated by hatching) are displayed on all the eight confirmation screens 63.

The user executes work for determining a final composition (a position in the print area and a size of the subject image) while confirming these two screens.

The size of the print image displayed in the work screen 61 is realized through buttons 71 and 73 displayed on a screen same as the screen on which the work screen 61 and the confirmation screen 63 are displayed. The button 71 is an enlargement button and the button 73 is a reduction button.

Figure 11A:
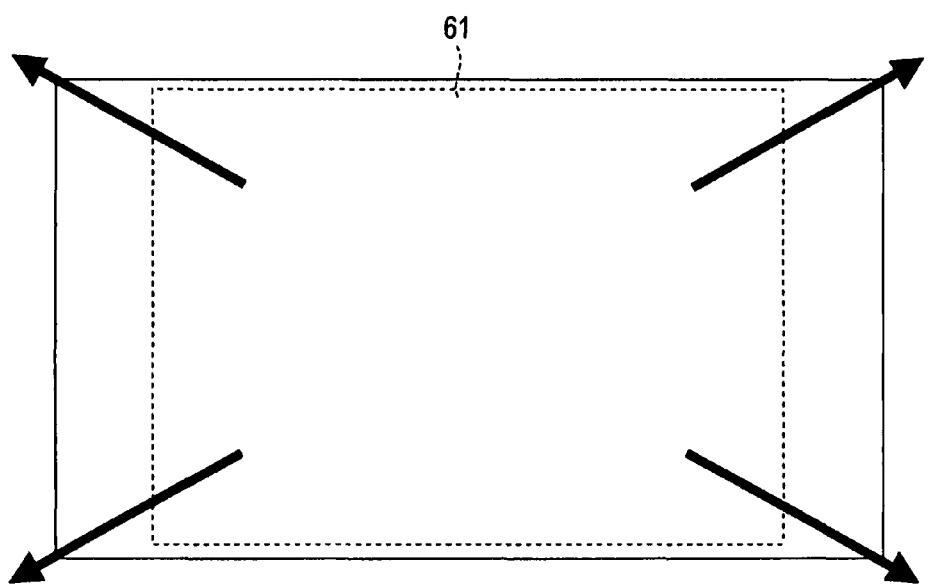
FIG. 11A is a diagram for explaining operation for enlarging a print image.

An example of a change in the subject image in the case in which the button 71 is operated is shown in FIG. 11A. In the case of FIG. 11A, the subject image is uniformly enlarged in a direction exceeding the work screen 61 (i.e., the print area). It is difficult to confirm the image in portions exceeding the outer edges in the work screen 61.

Figure 11B:
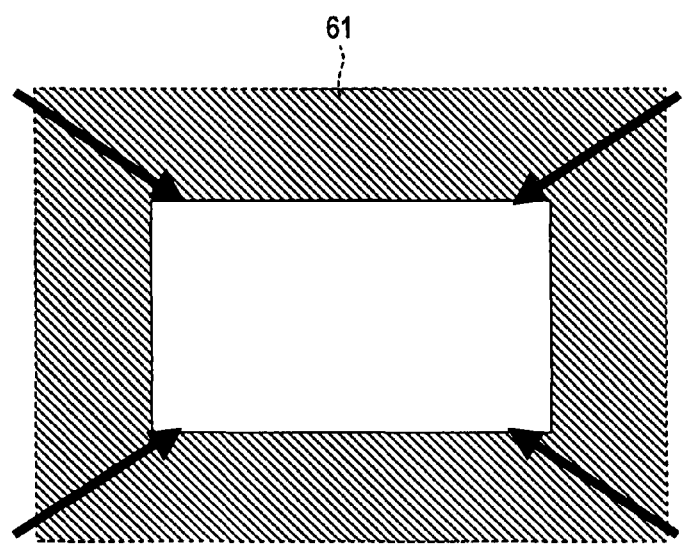
FIG. 11B is a diagram for explaining operation for reducing the print image.

An example of a change in the subject image in the case in which the button 73 is operated is shown in FIG. 11B. In the case of FIG. 11B, the subject image changes to be reduced in size in a direction to the center of the work screen 61 (i.e., the print area).

The adjustment of the positional relation of the subject image displayed in the work screen 61 to the print area is realized through buttons 75, 77, 79, and 81 displayed on a screen same as the screen on which the work screen 61 and the confirmation screen 63 are displayed.

Figure 12A:
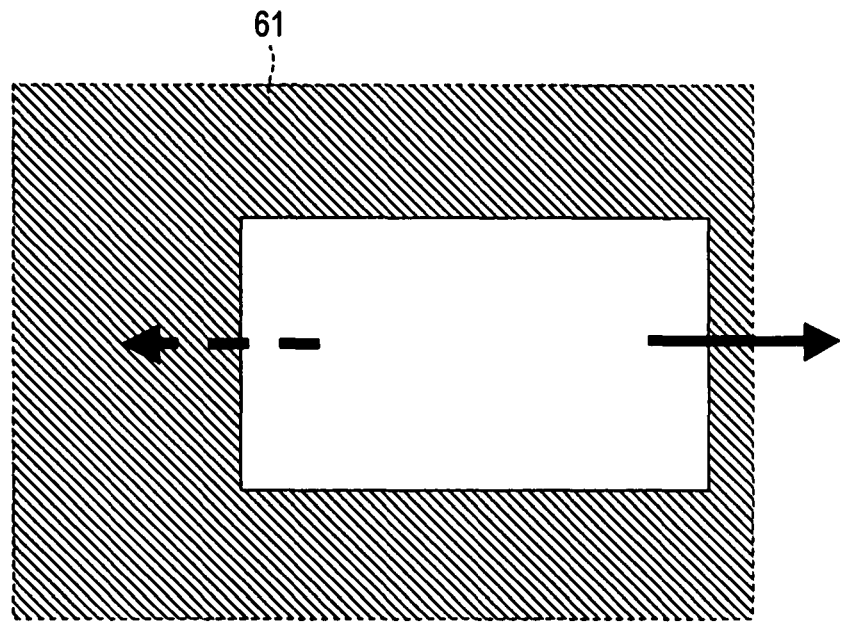
FIGS. 12A and 12B are diagrams for explaining operation for moving the print image.

An example of a change in the subject image in the case in which the button 75 or 77 is operated is shown in FIG. 12A.

In the case of FIG. 12A, the subject image moves in the right direction according to the operation of the button 75. This movement is indicated by a solid line. On the other hand, the subject image moves in the left direction according to the operation of the button 77. This movement is indicated by a broken line.

Figure 12B:
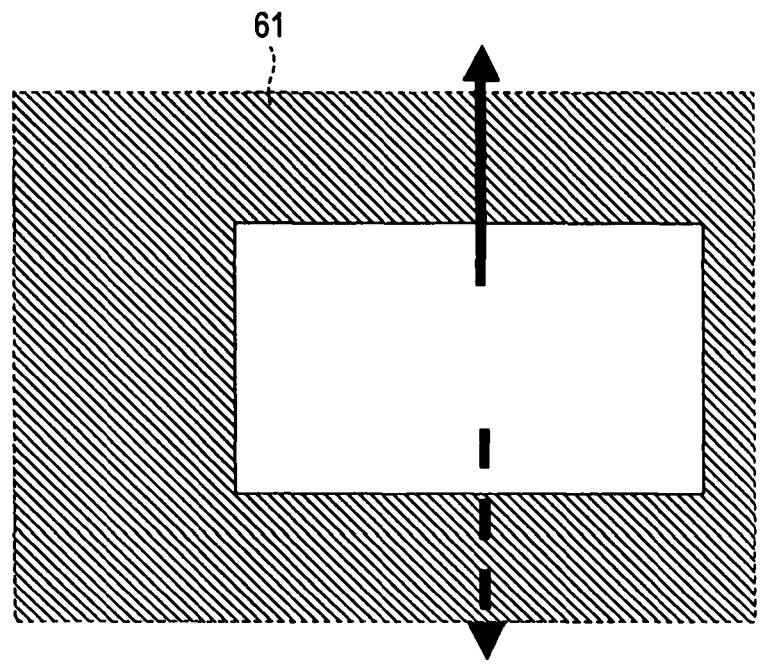

An example of a change in the subject image in the case in which the button 79 or 81 is operated is shown in FIG. 12B. In the case of FIG. 12B, the subject image moves in the up direction according to the operation of the button 79. This movement is indicated by a solid line. On the other hand, the subject image moves in the down direction according to the operation of the button 81. This movement is indicated by a broken line.

Figure 13:
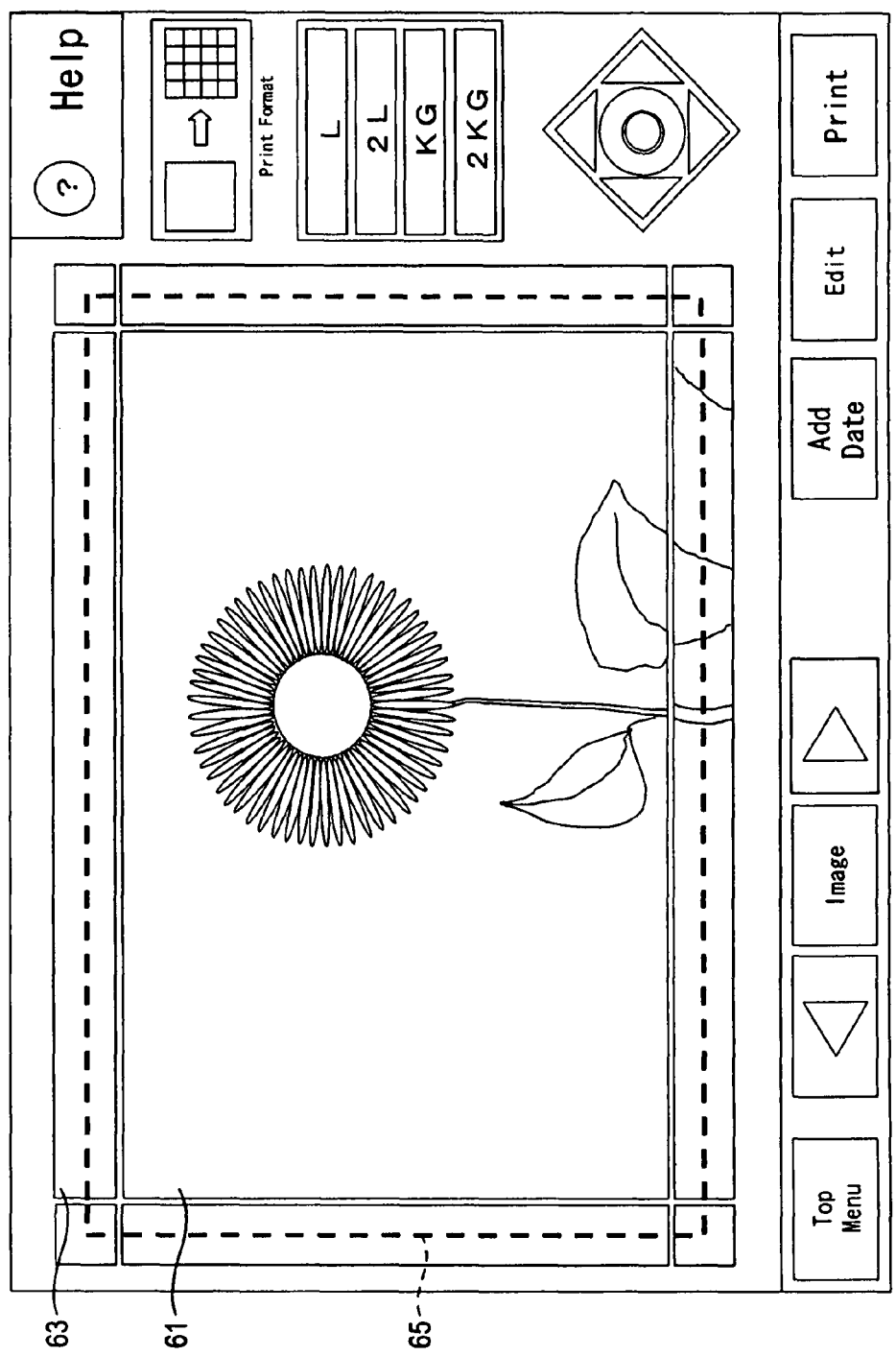
FIG. 13 is a diagram showing an example of the operation screen after editing.

An example of the operation screen after the operations of these buttons are combined is shown in FIG. 13. FIG. 13 is an example of the screen after enlargement and positioning are repeated to locate the flower of the original image substantially in the center of the screen. In the case of this example, it is possible to confirm the image near the outer edges of the work screen 61 in detail by checking the confirmation screen 63.

As shown in FIG. 13, in addition to the enlarged display of the image of the outer edges of the work screen 61, limit positions of the print area are indicated by the reference lines 65 on the confirmation screen 63. Therefore, when printing is executed in the present composition, it is possible to surely grasp which portions of the subject image are located in the print area and which portions of the subject image extend beyond the print area.

Figure 14:
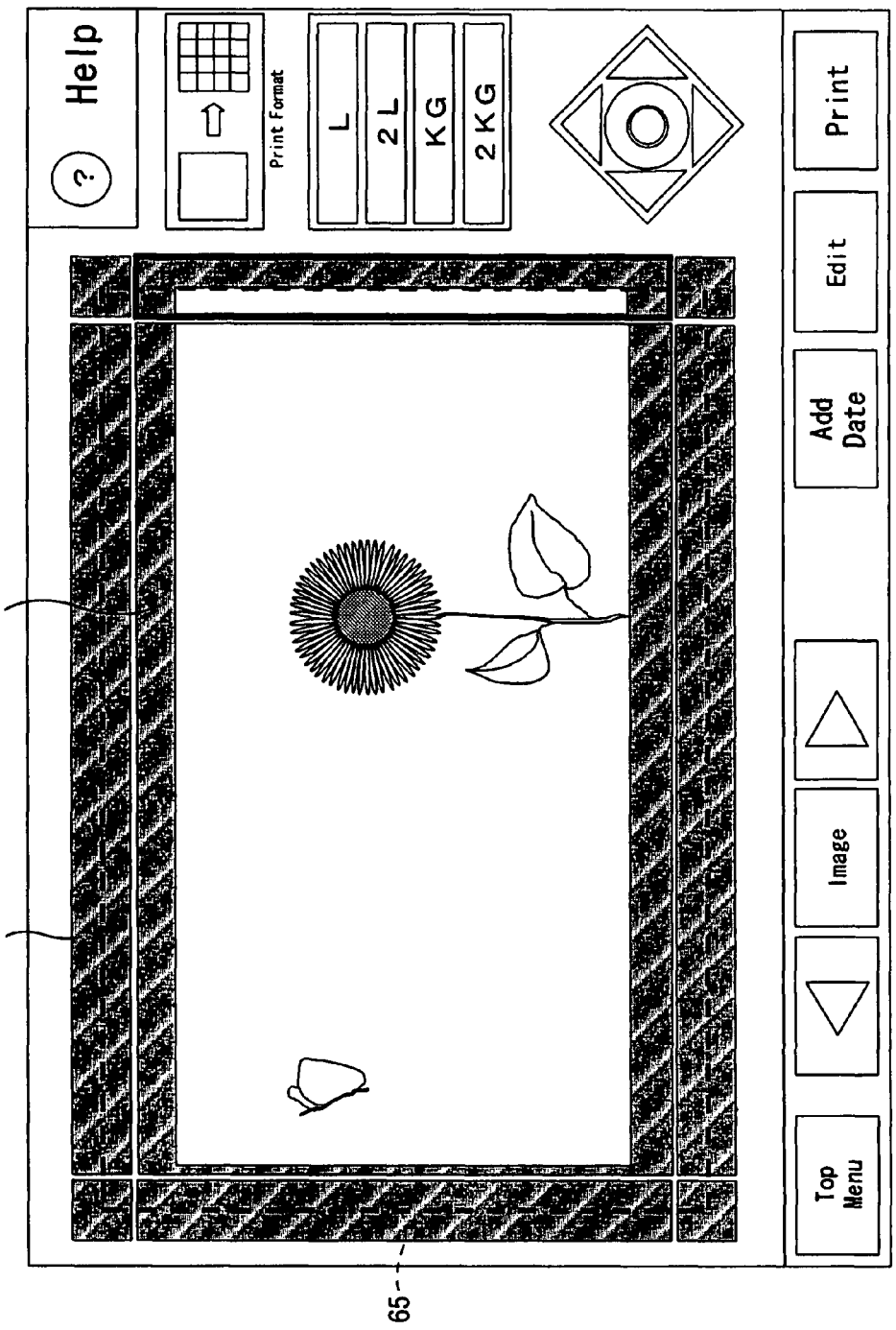
FIG. 14 is a diagram showing an example of highlight display of confirmation screens.

Another example of the operation screen after the operations of these buttons are combined is shown in FIG. 14. FIG. 14 is an example of an image in the case in which one of the outer edges of the subject image coincides with one of the outer edges of the work screen 61. In the case of FIG. 14, an outer frame of the confirmation screen 63, in which the coincidence of the outer edges are detected, is highlighted by a bold line. Concerning the confirmation screen 63 on which this highlighting is performed, it is seen that margins are not generated during printing.

Figure 15:
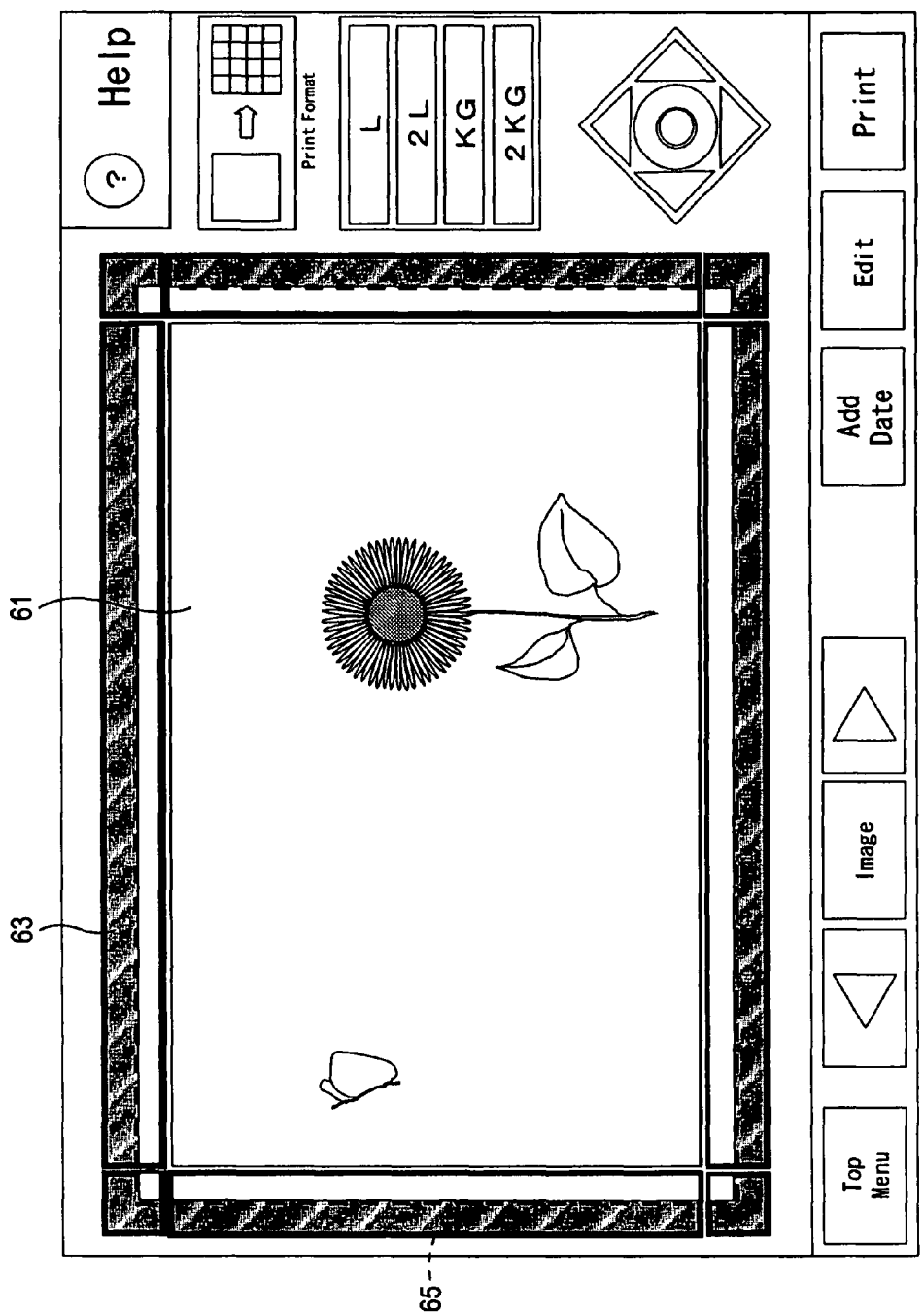
FIG. 15 is a diagram showing an example of display in the case in which outer edges of all four sides of a print image coincide with outer edges of an editing screen (a print area)

An example of the screen in a state in which all the eight outer edges of the subject image coincide with the outer edges of the work screen 61 (i.e., the print area) is shown in FIG. 15. In FIG. 15, a portion around the flower in the work screen 61 shown in FIG. 10 is reset as a subject image anew. The resetting of the subject image is performed according to slicing of a rectangular area in the work screen 61 and operation for setting the subject image in the present display contents.

When the display shown in FIG. 15 is obtained as a result of the editing operation, it is possible to confirm before print execution that unexpected margins are not generated at all the eight outer edges. In the case of this example, it is possible to minimize a magnification of the subject image as long as margins are not generated. This is also preferable in reducing deterioration in an image quality.

Other buttons are also displayed on the operation screen shown in FIG. 10.

For example, a button 83 is a button for instructing addition of a date. A button 85 is a button for instructing addition of an image frame, a balloon, or other decorations. Buttons 87 are buttons for instructing a change of the subject image displayed on the editing screen 61.

Buttons 89 are buttons for instructing a change of a sheet size. A button 91 is a button for instructing a change of a display screen format. In the case of this example, it is possible to change the display format between two formats, namely, a format for displaying only one selected print image on the screen and a format for displaying plural print images at a time in a list format. A button 93 is a button for instructing display of a help screen.

(A-6) Effect Obtained by Adopting the Operation Screen Described Above

As described above, in the case of this embodiment, it is possible to freely move the subject image set as the print object to the inside and the outside of the editing screen 61. It goes without saying that it is possible to freely enlarge and reduce the subject image.

As a result, it is possible to freely adjust a composition of the subject image (a position and a size of the subject image).

If the subject image is displayed in enlargement in the editing screen 61, it is possible to easily confirm a defocus state of the subject image set as the print object and details of the subject image.

On the other hand, if the subject image is displayed in reduction in the editing screen 61, it is possible to easily confirm a positional relation of the subject image to the print area and a relation of relative sizes. Since the positional relation between the print area and the subject image is clarified, it becomes easy to slice the subject image from the original image.

In the case of this embodiment, it is possible to use the reference lines 65 that indicate the outer edge positions of the editing screen 61 and the confirmation screen 63 on which the subject images located near the insides and the outsides of the reference lines 65 are displayed in enlargement. Therefore, it is possible to easily confirm presence or absence and the width of margins generated during print execution and boundary positions of the subject images cut off during print execution. As a result, it is possible to reduce the likelihood of appearance of unexpected margins during print execution. It is also possible to obtain a print result close to an intension of the user.

In the case of this embodiment, the function of highlighting, when the outer edges of the subject image set as the print object coincide with the outer edge positions (i.e., the reference lines 65) of the editing screen 61, the confirmation screen 63 in positions corresponding to the outer edges is implemented. Thus, it is possible to reduce a burden of confirmation in positioning the subject image to prevent margins from being generated. It is also possible to surely prevent generation of margins due to overlooking or misrecognition of the user.

In particular, when a display size that can be allocated to the confirmation screen 63 is small, the implementation of this highlighting function is extremely advantageous in eliminating margins.

When it is difficult to use this highlighting function, if the user desires to confirm presence or absence of margins, it is possible to improve confirm accuracy by increasing the magnification of the confirmation screen 63.

(B) Other Embodiments (B-1) Another Operation Screen

In the embodiment described above, the example of the operation screen is explained with reference to FIG. 10. In other words, the eight confirmation screens 63 corresponding to the four sides and the four corners of the editing screen 61 are arranged on the outside of the outer edges corresponding to the confirmation screens 63, respectively. However, the number and a display method of the confirmation screens 63 prepared are not limited to this.

For example, only one confirmation screen 63 may be displayed. In this case, in the confirmation screen 63, a method of displaying a subject image corresponding to an outer edge designated on the editing screen 61 is adopted. It is possible to realize the same convenience of use as the embodiment described above when such a display method is used.

Figure 16:
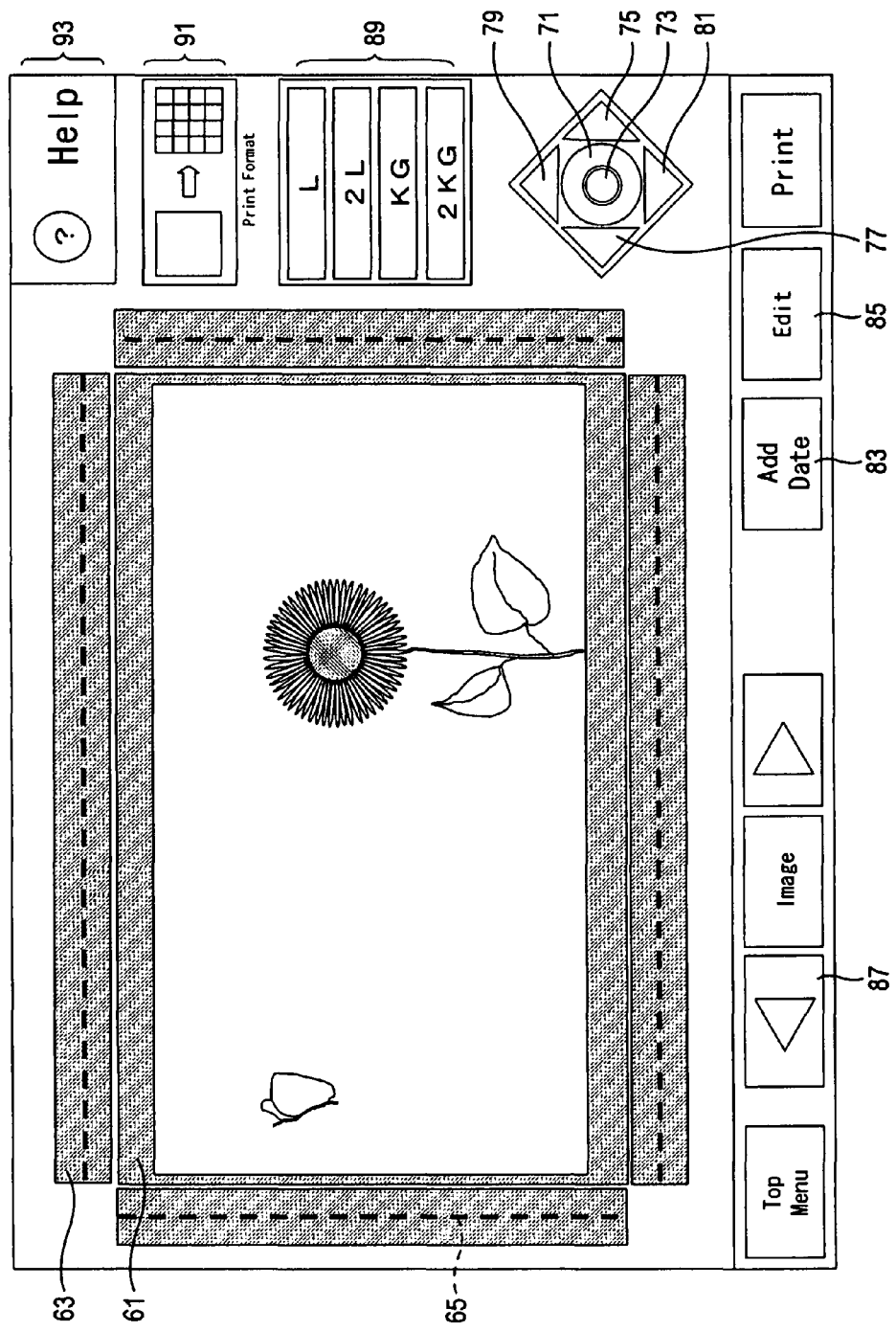
FIG. 16 is a diagram showing another example of display of the operation screen.

Further, for example, the confirmation screens 63 may be arranged only in positions corresponding to the four sides of the editing screen 61. An example of a display screen is shown in FIG. 16. This example of the display screen is the same as the example of the display screen in FIG. 10 except that the confirmation screens 63 corresponding to the four corners of the editing screen 61 are not present. It is also possible to arrange two confirmation screens 63 in total on the two sides in the vertical direction and the horizontal direction among the four sides, respectively.

(B-2) Still Another Operation Screen

In the case of the embodiment described above, the subject images twice as large as the subject image located near the outer edges of the editing screen 61 are displayed on the confirmation screens 63. However, since the subject images are displayed in a double size, naturally, it is difficult to display all the subject images located at the outer edges. Further, it is likely that positions of the subject images that can be confirmed are limited to specific portions of the editing screen 61.

Thus, according to another embodiment of the present invention, there is provided a display method that can clarify a relation between an image range displayed on the confirmation screens 63 and a display range of the editing screen 61.

Figure 17:
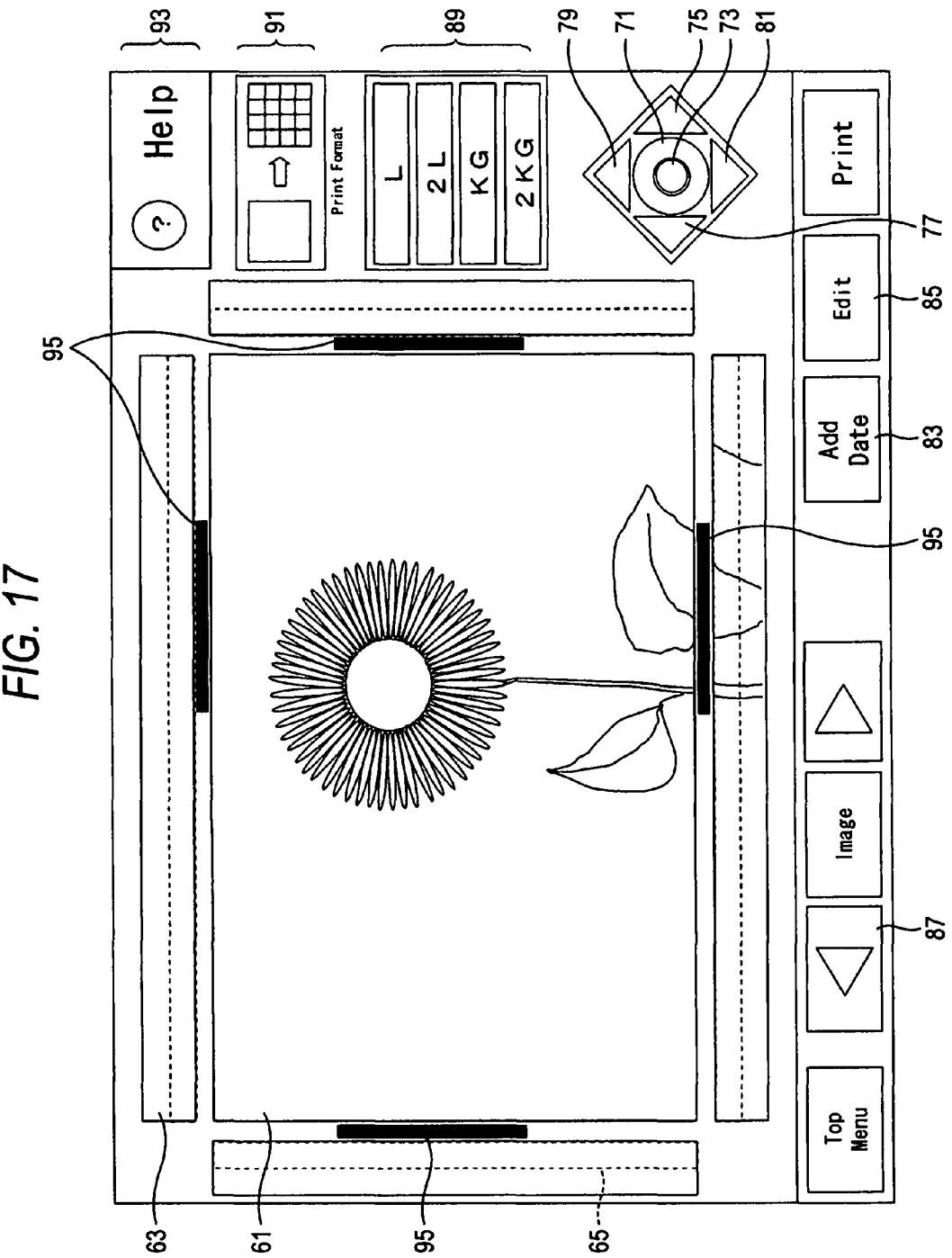
FIG. 17 is a diagram showing an example of an operation screen with slider bars.

An example of a display screen is shown in FIG. 17. In the display screen shown in FIG. 17, slider bars 95 indicating display ranges of the confirmation screens 63 are arranged between the editing screen 61 and the confirmation screens 63.

In the case of FIG. 17, the slider bar 95 on the bottom side is located in substantially the center of the editing screen 61. Therefore, the subject image in an area portion corresponding to this slider bar 95 is enlarged to the full width of the confirmation screen 63 and displayed.

If the display position of the slider bar 95 is slid, it is possible to change contents of the subject image that can be confirmed on the confirmation screen 63.

Figure 18A:
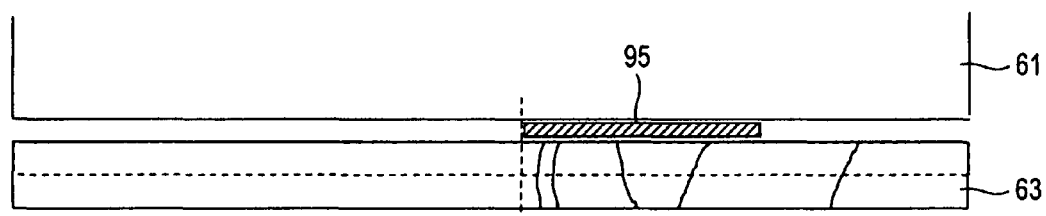
FIGS. 18A and 18B are diagrams for explaining a change in display contents of the confirmation screens corresponding to the movement of the slider bar.
Figure 18B:
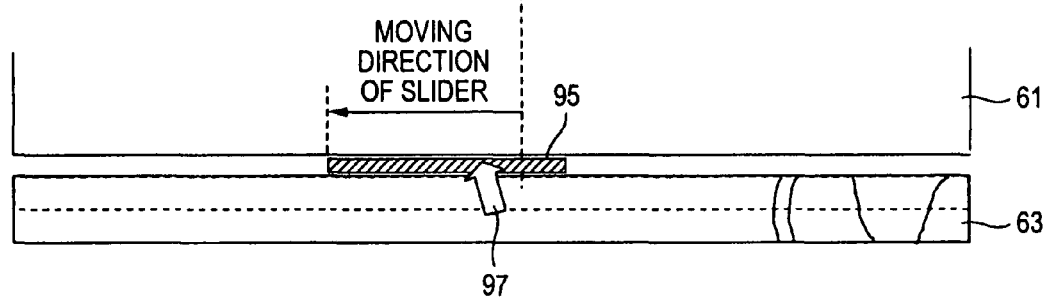

A change in a display screen in the case in which a cursor 97 is positioned on the slider bar 95 and the slider bar 95 is moved along the outer edge of the editing screen 61 is shown in FIGS. 18A and 18B.

The display screen before the movement of the slider bar 95 is shown in FIG. 18A. The display screen after the slider bar 95 is slid is shown in FIG. 18B.

Since a bar length of the slider bar 95 does not change, only display contents change according to the movement of the slider bar 95 while a display magnification of a subject image displayed on the confirmation screen 63 is not changed. The display contents of the confirmation screen 63 change in the same manner when the slider bars 95 corresponding to the other positions are operated.

The bar length of this slider bar 95 is desirably adjustable. In this case, a magnification of the confirmation screen 63 changes in association with the bar length.

Figure 19A:
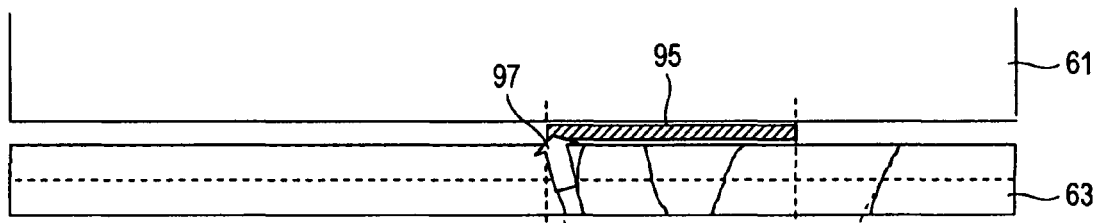
FIGS. 19A and 19B are diagrams for explaining a change in display contents of the confirmation screens in the case in which the length of the slider bar is adjusted.
Figure 19B:
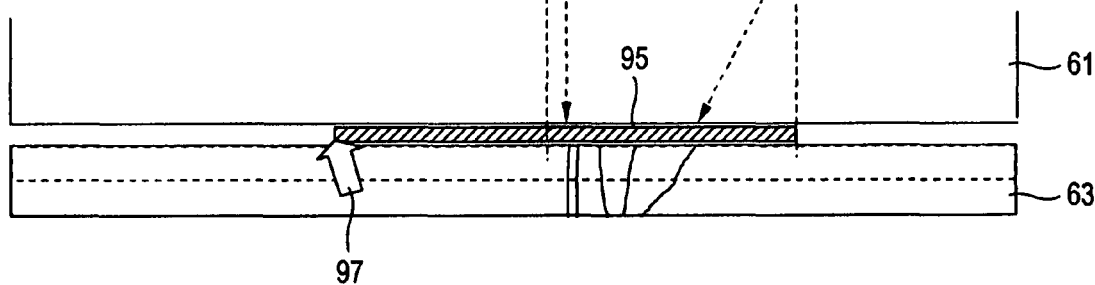

A change in display contents in the case in which the cursor 97 is positioned at the left end of the slider bar 95 and operated to move in the left direction to increase the bar length of the slider bar 95 is shown in FIGS. 19A and 19B.

The increase in the bar length of the slider bar 95 means that a decrease in a magnification.

The display screen before the bar length of the slider bar 95 is increased is shown in FIG. 19A. The display screen after the bar length of the slider bar 95 is increased is shown in FIG. 19B.

Conversely, it is also possible to adjust the bar length of the slider bar 95 to be reduced.

Figure 20A:
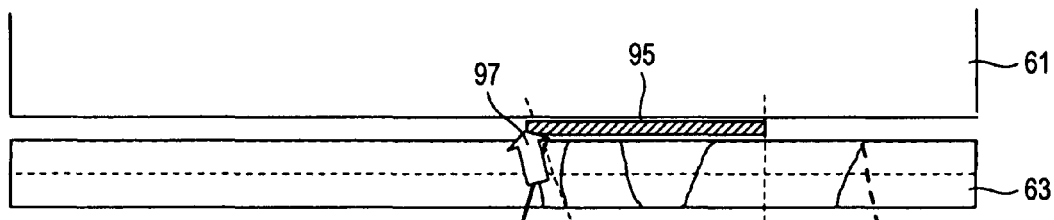
FIGS. 20A and 20B are diagrams for explaining a change in display contents of the confirmation screens in the case in which the length of the slider bar is adjusted.
Figure 20B:
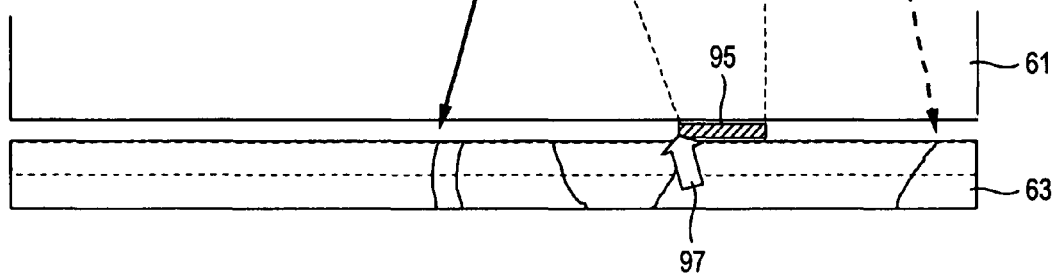

A change in display contents in the case in which the cursor 97 is positioned at the left end of the slider bar 95 and operated to move in the right direction to reduce the bar length of the slider bar 95 is shown in FIGS. 20A and 20B.

The reduction in the bar length of the slider bar 95 means that an increase in magnification.

The display screen before the bar length of the slider bar 95 is reduced is shown in FIG. 20A. The display screen after the bar length of the slider bar 95 is reduced is shown in FIG. 20B.

The changes in the display contents of the confirmation screen 63 associated with the slide motion and the adjustment of the length of the slider bar 95 do not always have to be limited to the respective confirmation screens 63 associated with the slider bars 95 set as the adjustment objects. For example, concerning the confirmation screens 63 in an opposed positional relation such as two confirmation screens located at the top and the bottom of the editing screen 61 and two confirmation screens located on the left and the right of the editing screen 61, the movement of the display position and the magnification may be changed in association with the adjustment for the slider bars 95.

Figure 21:
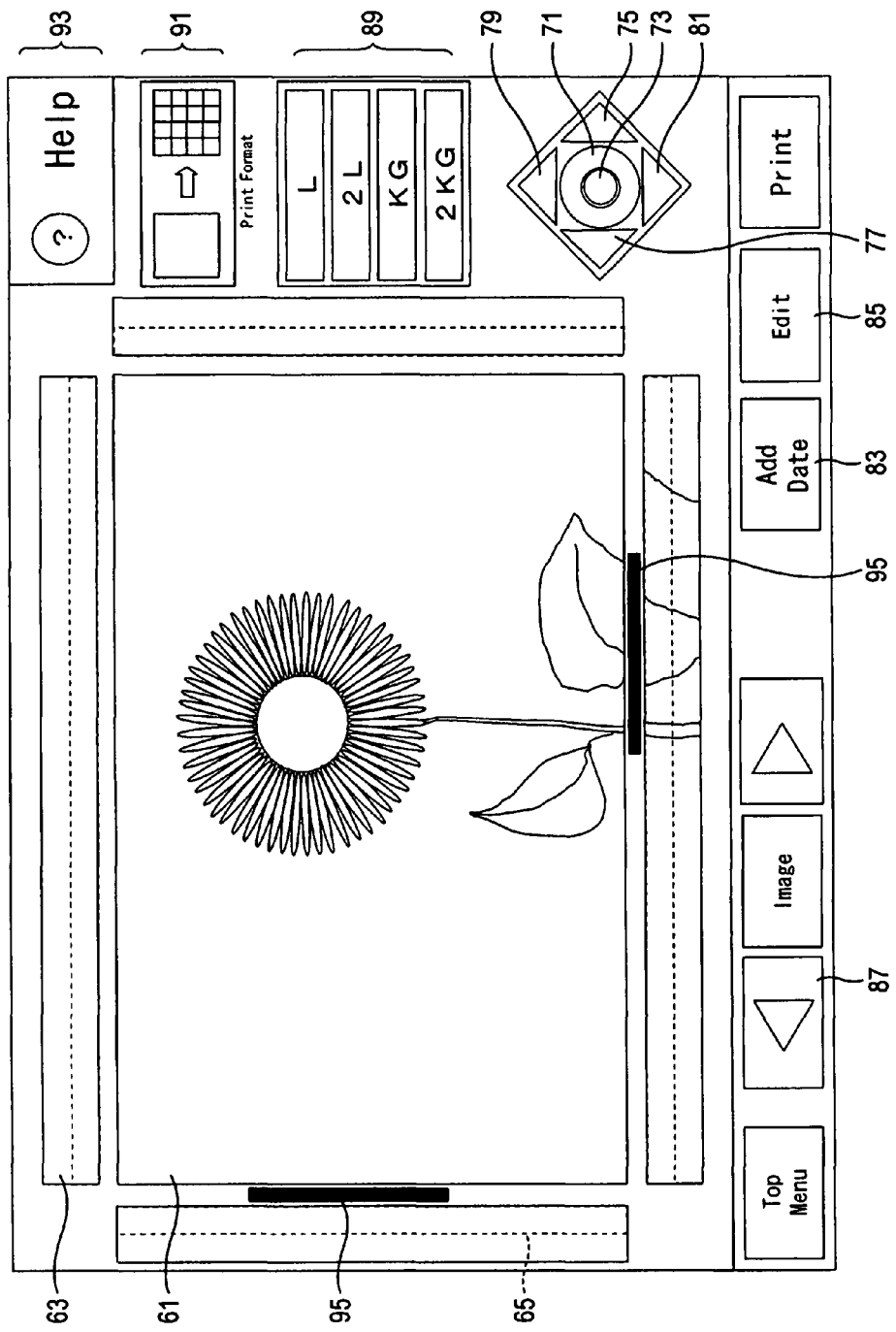
FIG. 21 is a diagram showing another example of display of the operation screen with the slider bars.

When the display contents of the confirmation screens 63 in the opposed positions change in association with the adjustment for the slider bars 95 in this way, the slider bars 95 do not have to be arranged on the four sides of the editing screen 61, respectively. For example, as shown in FIG. 21, a system for arranging the slider bars 95 in the vertical direction and the horizontal direction, respectively, may be adopted.

(B-3) Still Another Operation Screen

In the case of the embodiment described above (when the slider bar 95 is not used), the magnification of the subject images displayed on the confirmation screens 63 is only estimated on the basis of the difference between the size of the subject image in the editing screen 61 and the size of the subject images displayed in the confirmation screens 63.

Therefore, according to still another embodiment of the present invention, there is provided a mechanism for displaying, on the editing screen 61 and the confirmation screens 63, gauges indicating display dimensions of the subject images displayed on the respective screens along the outer edges of the respective screens.

Figure 22:
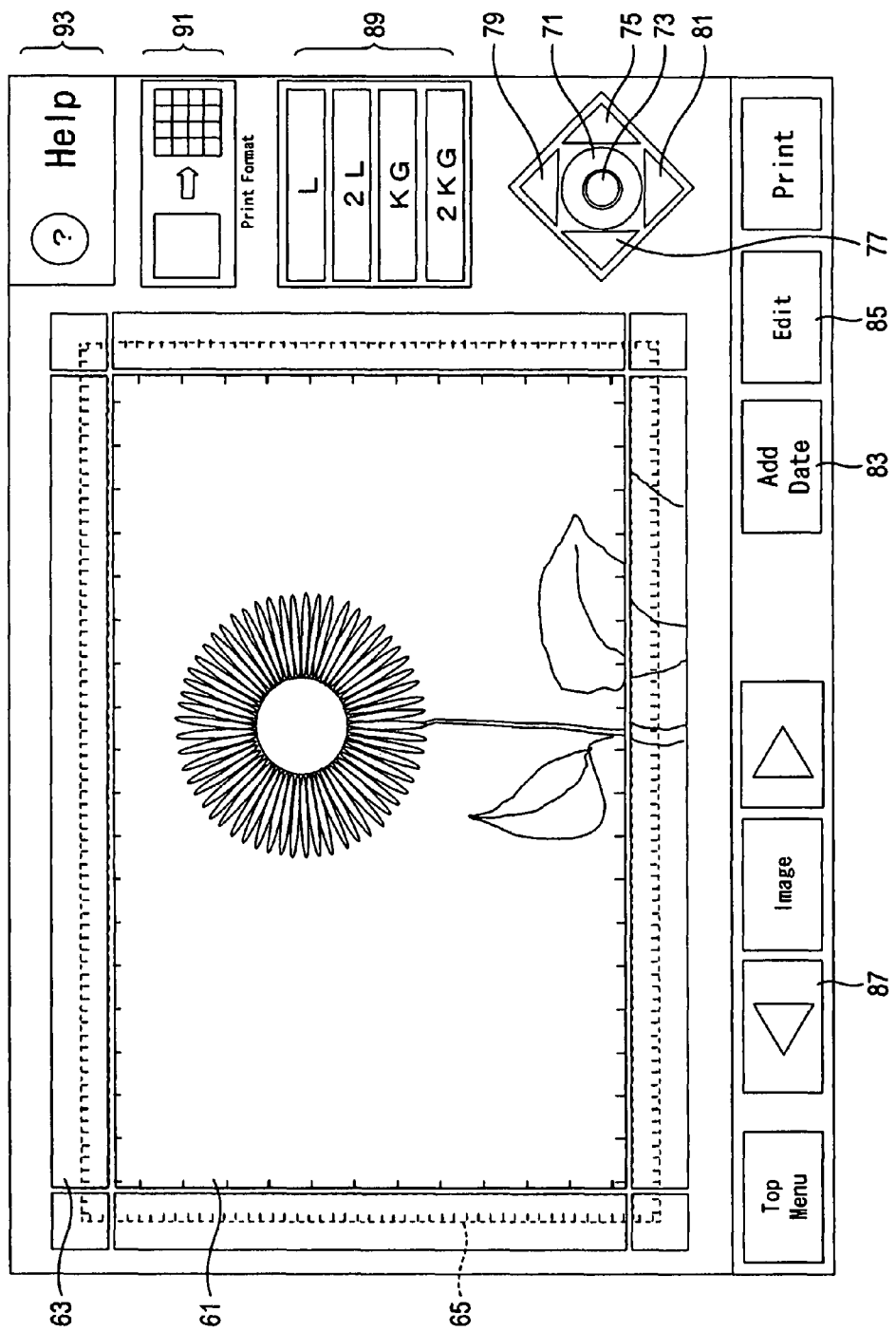
FIG. 22 is a diagram showing an example of an operation screen with a gauge.

An example of a display screen is shown in FIG. 22. In the case of FIG. 22, the gauges on the confirmation screens 63 side are displayed along the reference lines 65.

Figure 23:
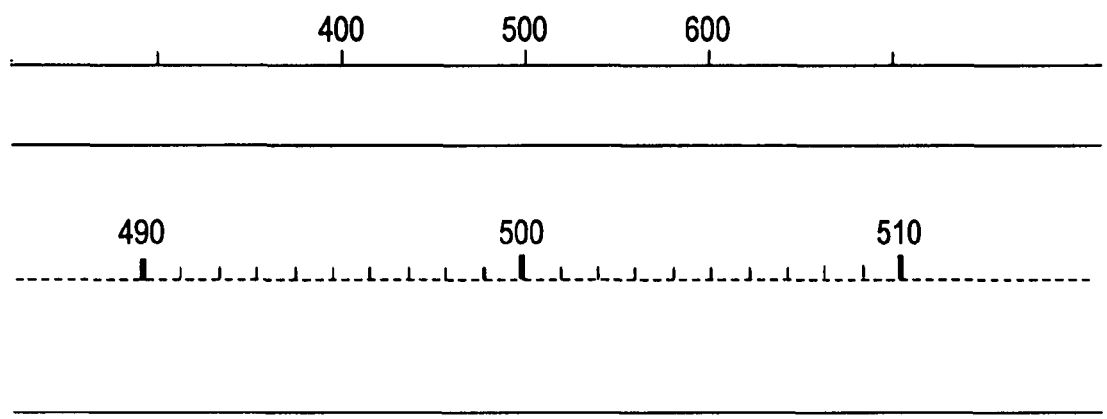
FIG. 23 is a diagram showing a dimensional relation between a gauge of the editing screen and a gauge of the confirmation screen.

An enlarged diagram of the gauge displayed on the editing screen 61 and the gauge displayed on the confirmation screen 63 is shown in FIG. 23.

As shown in FIG. 23, scales corresponding to actual dimensions are also displayed on the gauges. According to the comparison of the scales, the user can easily confirm a magnification of the subject image to the editing screen 61.

(B-4) Still Another Operation Screen

In the above explanation, the confirmation screen 63 is twice as large as the editing screen 61. However, the magnification is arbitrary. The magnification may be set in advance or a mechanism for allowing the user to change the magnification during use may be adopted.

(B-5) Still Another Operation Screen

In the above explanation, when the outer edges of the subject image and the outer edges of the editing screen 61 coincide with each other, the outer frame or the like of the confirmation screen 63 corresponding to the outer edges coinciding with each other is highlighted.

Figure 24:
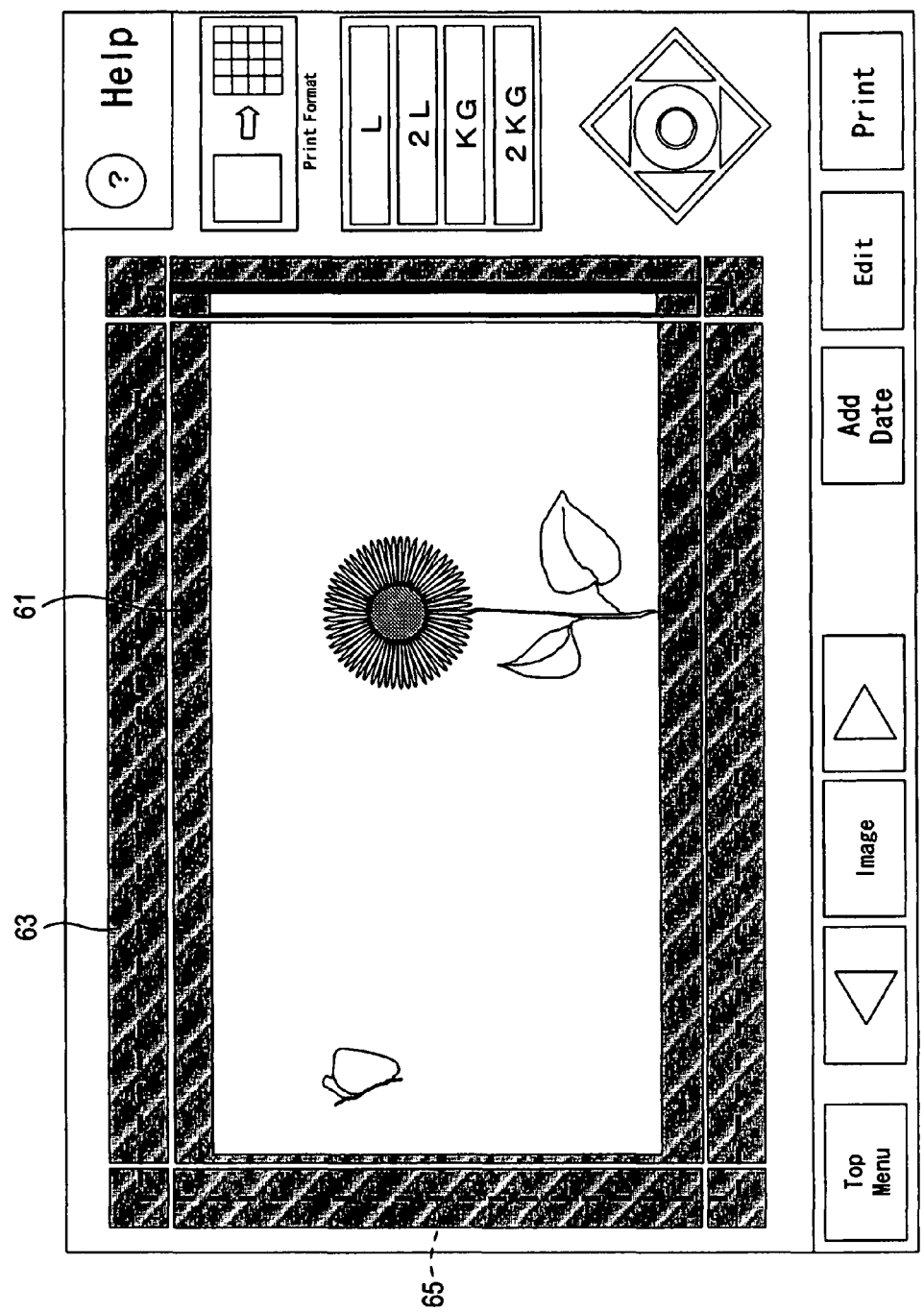
FIG. 24 is a diagram showing an example of highlight display on the confirmation screens.

However, as shown in FIG. 24, the reference line 65 may be highlighted. As a method of highlighting the reference line 65, for example, there are an increase in luminance, a change of a color, and a change of a line format. FIG. 24 is an example in the case in which the line format is changed.

(B-6) Example of an Apparatus Implemented with the Display Function

In the above explanation, the function of displaying the confirmation screens 63 used for confirmation of the outer edges on the surface same as the surface on which the editing screen 61 is displayed is implemented in the printing apparatus of the self-operation type.

However, it is also possible to implement the display function in other image processing apparatuses.

It is possible to implement the display function in, for example, printing apparatuses for office and home uses and printing apparatuses used in medical facilities. In this case, a basic functional structure is the same as that explained in the embodiment described above.

Figure 25:
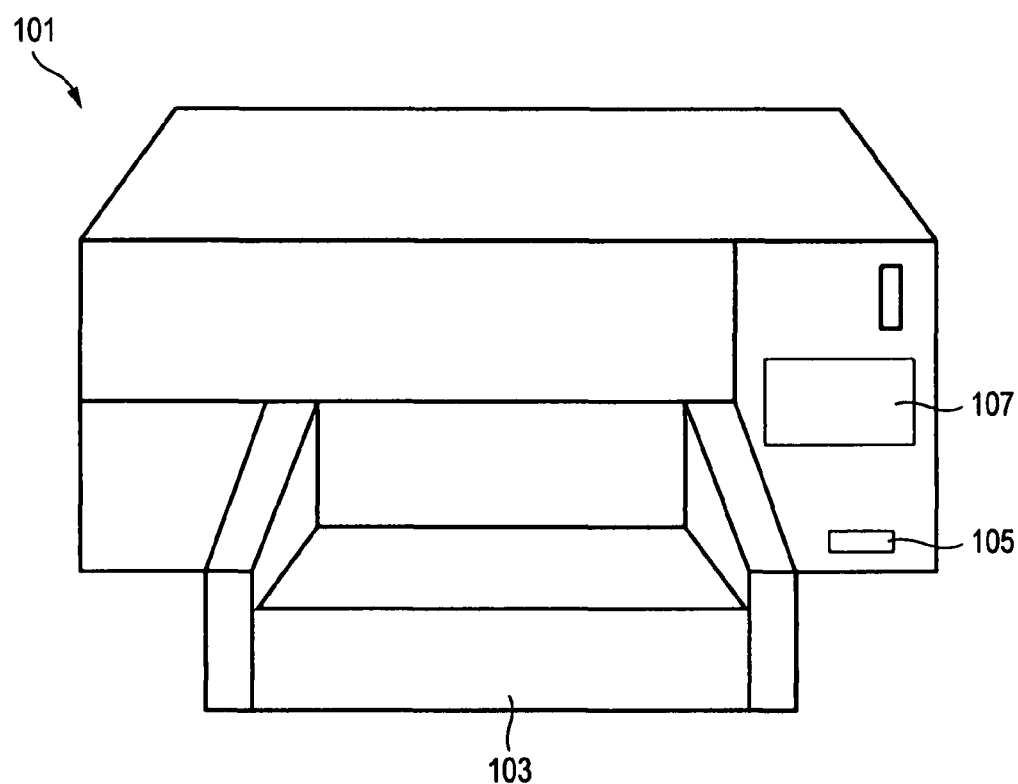
FIG. 25 is a diagram showing another example of an apparatus implemented with an operation screen generating function.

An example of an external appearance of a printing apparatus 101 of this type is shown in FIG. 25.

The printing apparatus 101 has a paper discharging unit, a media slot 105, and a display unit 107 in the front of a housing 103.

In the case of this embodiment, a subject image as a print object is displayed on the display unit 107. The confirmation screens 63 are displayed at the outer edges of the editing screen 61.

Besides, it is also possible to implement the display function in a complex type printing apparatus (a multi-function peripheral) in which a scanner is mounted on a printing apparatus. In this case, a basic functional structure is the same as that explained in the embodiment described above.

Figure 26:
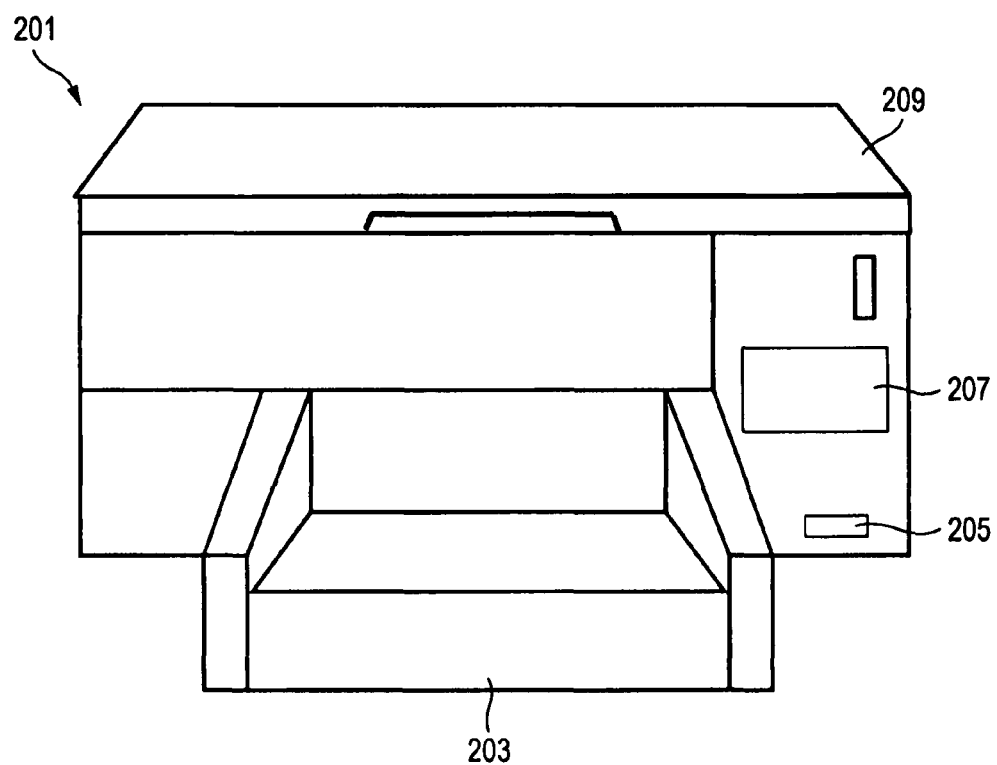
FIG. 26 is a diagram showing still another example of the apparatus implemented with the operation screen generating function.

An example of an external appearance of a multi-function peripheral 201 is shown in FIG. 26. The multi-function peripheral 201 has a paper discharging unit, a media slot 205, and a display unit 207 in the front of a housing 203. A scanner 209 is mounted on the upper surface of the housing 203.

In the case of this embodiment, a subject image as a print object is displayed on the display unit 207. The confirmation screens 63 are displayed at the outer edges of the editing screen 61.

Besides, it is also possible to implement the display function in, for example, a digital still camera and other imaging apparatuses. The imaging apparatuses can acquire information on a print sheet through direct communication with a printing apparatus at an output destination of image data.

Figure 27:
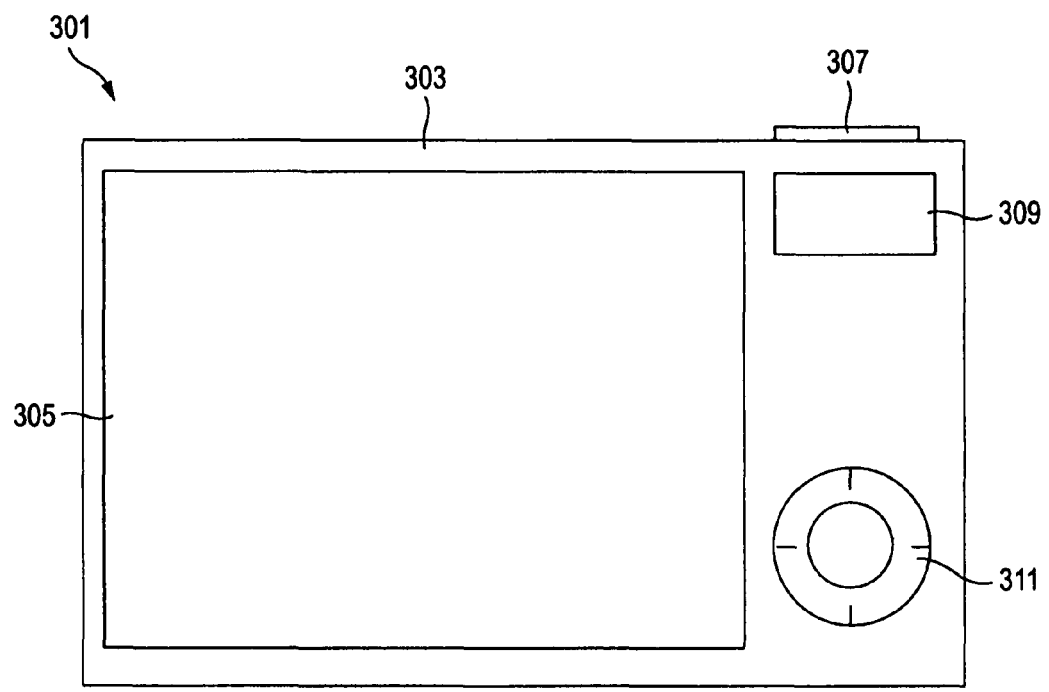
FIG. 27 is a diagram showing still another example of the apparatus implemented with the operation screen generating function.

An example of an external appearance of the digital still camera 301 is shown in FIG. 27. The digital still camera 301 has a display unit 305, a push button 307, a peep hole 309, and an operation button 311 on a user operation surface among six surfaces forming a housing 303. Although not shown in FIG. 27, an imaging device and a signal processing unit therefor are mounted on the digital still camera 301.

In the case of this embodiment, a subject image as a print object is displayed on the display unit 305. The confirmation screens 63 are displayed at the outer edges of the editing screen 61.

In the case of the digital still camera 301, as in the cases described above, a signal processing function therefor excluding a printing function, a sound processing function, and the like can be formed by a signal processing unit same as that of the self-operation type printing apparatus 11.

In this way, it is possible to implement the display function of the operation screen in, other than apparatuses integrated with printing devices, imaging apparatuses and other image processing apparatuses that can output print data to printing apparatuses through a network.

On the image processing apparatuses of this type, it is possible to mount not only apparatuses exclusively used for imaging such as a digital still camera but also electronic apparatuses (a cellular phone and a portable information apparatuses) mounted with imaging cameras, image editing apparatuses implemented with an image editing function, computers, and the like.

(B-6) Method of Realizing the Display Function

In the above explanation, the display function of the operation screen including the editing screen 61 and the confirmation screen 63 is realized as software (a computer program) executed through the system control unit 33.

However, an equivalent function may be realized by hardware entirely or partially.

(B-7) Printing Device

In the above explanation, the print head of the sublimation type is mounted as the printing device.

However, the printing device is arbitrary. For example, in the case of an ink jet printer, it is possible to use an ink jet head. In the case of a laser printer, it is possible to use a laser beam source, a photosensitive drum, and the like.

(B-8) Others

Various modifications of the embodiments described above are conceivable without departing from the spirit of the present invention. Further, various modifications and applications created or combined on the basis of the description of this specification are also conceivable.

It should be understood by those skilled in the art that various modifications, combinations, sub-combinations, and alterations may occur depending on design requirements and other factors insofar as they are within the scope of the appended claims or the equivalents thereof.

What is claimed is:

1. An operation screen image display generating apparatus providing a dynamic a print image preview comprising:
   an image display generating unit that displays a subject image on a display device; and
   a print preview display generating unit that displays a print preview confirmation screen in a portion of the display device, wherein the image data in the print preview confirmation screen is dynamically altered based on a user input and having an outer edge printable image data and an aspect ratio of image data presented on the print preview display confirmation screen is automatically adjusted to correspond to a selected print size and is altered relative to the image of the image display generating unit and further comprising an automatically generated visual indicator for identifying when an outer edge of a desired portion of the subject image coincides with a margin region based on an automated determination of whether an outer edge of a subject image and outer edge of a job screen coincide with one another, the automatically generated visual indicator providing a visual identification of coincidence separate from a boundary designation.

2. An operation screen image display generating apparatus according to claim 1, wherein the print preview confirmation screen is arranged to correspond to a plurality of the outer edge positions.

3. An operation screen image display generating apparatus according to claim 1, wherein the print preview confirmation screen is arranged at an outer side of the display device.

4. An operation screen image display generating apparatus according to claim 1, further comprising a slider bar representing a positional relation of the subject image corresponding to the print preview confirmation screen.

5. An operation screen image display generating apparatus according to claim 4, further comprising variably magnification of the print preview confirmation screen.

6. An operation screen image display generating apparatus according to claim 1, wherein gauges representing display dimensions are displayed.

7. An operation screen image display generating apparatus according to claim 1, wherein, when an outer edge of the subject image and an outer edge of the display device coincide with each other, display of the print preview confirmation screen corresponding to the outer edge or the reference line corresponding to the outer edge is highlighted.

8. An image data processing apparatus comprising:
   an operation input unit;
   a display device;
   an image display generating unit that displays a subject image on a display device a print preview display generating unit that displays a print preview confirmation screen in a portion of the display device wherein the image device in the print preview confirmation screen is dynamically altered based on a user input and an aspect ratio of image data presented on the print preview display confirmation screen is automatically adjusted to correspond to a selected print size and is altered relative to the image of the image display generating unit and further comprising an automatically generated visual indicator for identifying when an outer edge of a desired portion of the subject image coincides with a margin region based on an automated determination of whether an outer edge of a subject image and outer edge of a job screen coincide with one another, the automatically generated visual indicator providing a visual identification of coincidence separate from a boundary designation.

9. An imaging apparatus comprising:
   an imaging device;
   an operation input unit;
   a display device;
   an interface that outputs print data to a printing device;
   an image generating unit that displays a subject image on the display device;
   a print preview display generating unit that displays a print preview confirmation screen in a portion of the display device wherein the image in the print preview confirmation screen is dynamically altered based on a user input; and
   a print-data generating unit that supplies, on condition that execution of printing is instructed, print data to the printing device and an aspect ratio of image data presented on the print preview display confirmation screen is automatically adjusted to correspond to a selected print size and is altered relative to the image of the image display generating unit and further comprising an automatically generated visual indicator for identifying when an outer edge of a desired portion of the subject image coincides with a margin region based on an automated determination of whether an outer edge of a subject image and outer edge of a job screen coincide with one another, the automatically generated visual indicator providing a visual identification of coincidence separate from a boundary designation.

10. An image data processing method for providing printer data comprising:
   displaying a subject image on a display device; and
   displaying a print preview confirmation screen in a portion of the display device wherein the image in the print preview confirmation screen is dynamically altered based on a user input and an aspect ratio of image data presented on the print preview display confirmation screen is automatically adjusted to correspond to a selected print size and is altered relative to the image on the display device and further comprising an automatically generated visual indicator for identifying when an outer edge of a desired portion of the subject image coincides with a margin region based on an automated determination of whether an outer edge of a subject image and outer edge of a job screen coincide with one another, the automatically generated visual indicator providing a visual identification of coincidence separate from a boundary designation.

11. A computer program stored in a non-transitory electronic memory of a processor controlled system which when executed by the processor controlled system processes image data to provide:
   display of a subject image on a display device; and
   display of a print preview confirmation screen in a portion of the display device wherein the image device in the print preview confirmation screen is dynamically altered by a user and an aspect ratio of image data presented on the print preview display confirmation screen is automatically adjusted to correspond to a selected print size and is altered relative to the image on the display device and further comprising an automatically generated visual indicator for identifying when an outer edge of a desired portion of the subject image coincides with a margin region based on an automated determination of whether an outer edge of a subject image and outer edge of a job screen coincide with one another, the automatically generated visual indicator providing a visual identification of coincidence separate from a boundary designation.

* * * * *